US008112330B1

(12) United States Patent  (10) Patent No.: US 8,112,330 B1
Grandcolas et al.  (45) Date of Patent: Feb. 7, 2012

(54) SYSTEM AND METHOD FOR DELIVERING FINANCIAL SERVICES

(75) Inventors: Michael L. Grandcolas, Santa Monica, CA (US); Nancy Bryant, Los Angeles, CA (US); Howard A. Schechtman, Agoura Hills, CA (US); Dilip J. Parekh, Los Angeles, CA (US)

(73) Assignee: Citibank Development Center, Inc., Los Angeles, CA (US)

( * ) Notice: Subject to any disclaimer, the term of this patent is extended or adjusted under 35 U.S.C. 154(b) by 3148 days.

(21) Appl. No.: 09/671,424

(22) Filed: Sep. 27, 2000

Related U.S. Application Data

(63) Continuation-in-part of application No. 09/323,210, filed on Jun. 1, 1999, now Pat. No. 7,249,344, which is a continuation of application No. 08/908,413, filed on Aug. 7, 1997, now Pat. No. 5,933,816.

(60) Provisional application No. 60/169,982, filed on Dec. 10, 1999.

(51) Int. Cl.
*G06Q 40/00* (2006.01)
(52) U.S. Cl. .................. 705/35; 705/42; 705/43; 705/44
(58) Field of Classification Search .................... 705/35, 705/42–44; 235/379
See application file for complete search history.

(56) References Cited

U.S. PATENT DOCUMENTS

| | | | |
|---|---|---|---|
| 4,321,672 A | 3/1982 | Braun et al. | 705/42 |
| 4,489,438 A | 12/1984 | Hughes | 704/258 |
| 4,625,276 A | 11/1986 | Benton et al. | 705/44 |
| 4,804,830 A | 2/1989 | Miyagisima et al. | 235/379 |
| 4,905,186 A | 2/1990 | Fukui | 705/39 |
| 5,010,238 A | 4/1991 | Kadono et al. | 235/379 |
| 5,025,373 A | 6/1991 | Keyser, Jr. et al. | 705/42 |
| 5,050,207 A | 9/1991 | Hitchcock | 379/93.19 |
| 5,083,272 A | 1/1992 | Walker et al. | 463/25 |
| 5,132,521 A | 7/1992 | Smith et al. | 235/382 |
| 5,159,685 A | 10/1992 | Kung | 714/26 |

(Continued)

FOREIGN PATENT DOCUMENTS

JP  09027064 A  *  1/1997

(Continued)

OTHER PUBLICATIONS

Greenfield, David, "Product Spotlight: Business Layers eProvisionware," *Network Magazine*, NA, Jun. 1, 2000.

(Continued)

*Primary Examiner* — Ella Colbert
(74) *Attorney, Agent, or Firm* — Johnson & Associates

(57) ABSTRACT

A delivery system and method allow a financial institution to provide financial services to a plurality of remote devices and internally within the financial institution to staff terminals using a set of re-usable global components which are modular and are organized into services sets. The system and method operate in sessions and, for instance, employ a dialog component for gathering information from a customer, a rule broker component for providing answers to the various legal and regulatory rules in a particular country, a language man component for selecting appropriate language, a transaction executor component for performing transactions, and a presentation manager component for formatting outputs to the customer. The system and method provide interfaces which can be configured and delivered to the customer in a globally consistent format that is based on the customer's account profile, various languages, various currencies, different legal regulatory requirements, as well as, different sets of business products.

1 Claim, 31 Drawing Sheets

U.S. PATENT DOCUMENTS

| | | | |
|---|---|---|---|
| 5,179,700 A | 1/1993 | Aihara et al. | 395/650 |
| 5,220,501 A | 6/1993 | Lawlor et al. | 705/40 |
| 5,305,200 A | 4/1994 | Hartheimer et al. | 705/37 |
| 5,309,506 A | 5/1994 | Alexander | 379/93.02 |
| 5,353,331 A | 10/1994 | Emery et al. | 455/461 |
| 5,375,070 A | 12/1994 | Hershey et al. | 709/224 |
| 5,453,601 A | 9/1995 | Rosen | 705/65 |
| 5,463,775 A | 10/1995 | DeWitt et al. | 702/186 |
| 5,465,206 A | 11/1995 | Hilt et al. | 705/40 |
| 5,475,844 A | 12/1995 | Shiramizu et al. | 718/104 |
| 5,485,370 A | 1/1996 | Moss et al. | 709/217 |
| 5,559,313 A | 9/1996 | Claus et al. | 705/30 |
| 5,559,958 A | 9/1996 | Farrand et al. | 714/27 |
| 5,583,928 A | 12/1996 | Tester et al. | 379/221.03 |
| 5,589,855 A * | 12/1996 | Blumstein et al. | 345/173 |
| 5,604,896 A | 2/1997 | Duxbury et al. | 395/500 |
| 5,604,904 A | 2/1997 | Kini | 719/318 |
| 5,606,706 A | 2/1997 | Takamoto et al. | 711/100 |
| 5,616,901 A * | 4/1997 | Crandall | 235/379 |
| 5,651,006 A | 7/1997 | Fujino et al. | 370/408 |
| 5,675,746 A | 10/1997 | Marshall | 705/35 |
| 5,678,039 A | 10/1997 | Hinks et al. | 395/604 |
| 5,682,482 A | 10/1997 | Burt et al. | 705/42 |
| 5,699,522 A | 12/1997 | Shimizu et al. | 709/203 |
| 5,710,889 A | 1/1998 | Clark et al. | 235/379 |
| 5,724,503 A | 3/1998 | Kleinman et al. | 719/318 |
| 5,748,896 A | 5/1998 | Daly et al. | 709/223 |
| 5,761,502 A | 6/1998 | Jacobs | 707/103 R |
| 5,761,647 A | 6/1998 | Boushy | 705/10 |
| 5,762,376 A * | 6/1998 | Taskett | 283/57 |
| 5,768,501 A | 6/1998 | Lewis | 714/48 |
| 5,784,359 A | 7/1998 | Bencheck et al. | 370/244 |
| 5,787,403 A | 7/1998 | Randle | 705/43 |
| 5,790,541 A | 8/1998 | Patrick et al. | 370/392 |
| 5,793,753 A | 8/1998 | Hershey et al. | 370/252 |
| 5,794,218 A * | 8/1998 | Jennings et al. | 705/35 |
| 5,794,234 A | 8/1998 | Church et al. | 707/4 |
| 5,819,284 A | 10/1998 | Farber et al. | 707/104 |
| 5,828,840 A | 10/1998 | Cowan et al. | 709/203 |
| 5,852,811 A | 12/1998 | Atkins | 705/36 R |
| 5,857,079 A | 1/1999 | Claus et al. | 705/33 |
| 5,870,558 A | 2/1999 | Branton, Jr. et al. | 709/224 |
| 5,870,561 A | 2/1999 | Jarvis et al. | 709/238 |
| 5,887,139 A | 3/1999 | Madison, Jr. et al. | 709/223 |
| 5,890,140 A * | 3/1999 | Clark et al. | 705/35 |
| 5,907,848 A | 5/1999 | Zaiken et al. | 707/202 |
| 5,910,803 A | 6/1999 | Grau et al. | 715/734 |
| 5,913,037 A | 6/1999 | Spofford et al. | 709/226 |
| 5,926,636 A | 7/1999 | Lam et al. | 719/313 |
| 5,933,816 A | 8/1999 | Zeanah et al. | 705/35 |
| 5,943,655 A | 8/1999 | Jacobson | 705/30 |
| 5,958,009 A | 9/1999 | Friedrich et al. | 709/224 |
| 5,958,010 A | 9/1999 | Agarwal et al. | 709/224 |
| 5,960,200 A | 9/1999 | Eager et al. | 717/147 |
| 5,961,594 A | 10/1999 | Bouvier et al. | 709/223 |
| 5,983,197 A | 11/1999 | Enta | 705/16 |
| 6,000,000 A | 12/1999 | Hawkins et al. | 707/201 |
| 6,003,019 A * | 12/1999 | Eaton et al. | 705/42 |
| 6,012,050 A * | 1/2000 | Eaton et al. | 705/42 |
| 6,023,688 A | 2/2000 | Ramachandran et al. | 705/44 |
| 6,026,504 A | 2/2000 | Hagiwara | 714/47 |
| 6,052,711 A | 4/2000 | Gish | 709/203 |
| 6,058,378 A * | 5/2000 | Clark et al. | 705/37 |
| 6,061,666 A * | 5/2000 | Do et al. | 705/43 |
| 6,112,983 A | 9/2000 | D'Anniballe et al. | 235/379 |
| 6,138,250 A | 10/2000 | Nouri et al. | 714/31 |
| 6,195,685 B1 | 2/2001 | Mukherjee et al. | 709/205 |
| 6,226,623 B1 | 5/2001 | Schein et al. | 705/35 |
| 6,236,989 B1 | 5/2001 | Mandyam et al. | 707/4 |
| 6,266,709 B1 | 7/2001 | Gish | 719/315 |
| 6,266,721 B1 | 7/2001 | Sheikh et al. | 710/100 |
| 6,269,330 B1 | 7/2001 | Cidon et al. | 714/43 |
| 6,308,206 B1 | 10/2001 | Singh | 709/223 |
| 6,311,165 B1 | 10/2001 | Coutts et al. | 705/21 |
| 6,324,658 B1 | 11/2001 | Jasperneite et al. | 714/43 |
| 6,327,677 B1 | 12/2001 | Garg et al. | 714/37 |
| 6,330,600 B1 | 12/2001 | Matchefts et al. | 709/223 |
| 6,332,217 B1 | 12/2001 | Hastings | 717/178 |
| 6,347,374 B1 | 2/2002 | Drake et al. | 726/1 |
| 6,349,325 B1 | 2/2002 | Newcombe et al. | 709/202 |
| 6,349,333 B1 | 2/2002 | Panikatt et al. | 709/223 |
| 6,370,572 B1 | 4/2002 | Lindskog et al. | 709/223 |
| 6,370,586 B2 | 4/2002 | Davis et al. | 709/244 |
| 6,385,644 B1 | 5/2002 | Devine et al. | 709/206 |
| 6,404,743 B1 | 6/2002 | Meandzija | 370/254 |
| 6,446,123 B1 | 9/2002 | Ballantine et al. | 709/224 |
| 6,446,134 B1 | 9/2002 | Nakamura | 719/313 |
| 6,446,218 B1 | 9/2002 | D'Souza | 714/4 |
| 6,460,070 B1 | 10/2002 | Turek et al. | 709/202 |
| 6,470,386 B1 | 10/2002 | Combar et al. | 709/224 |
| 6,473,407 B1 | 10/2002 | Ditmer et al. | 370/252 |
| 6,502,131 B1 | 12/2002 | Vaid et al. | 709/224 |
| 6,502,133 B1 | 12/2002 | Baulier et al. | 709/224 |
| 6,505,177 B1 * | 1/2003 | Drummond et al. | 705/43 |
| 6,513,019 B2 | 1/2003 | Lewis | 705/35 |
| 6,513,060 B1 | 1/2003 | Nixon et al. | 709/203 |
| 6,526,442 B1 | 2/2003 | Stupek, Jr. et al. | 709/224 |
| 6,532,497 B1 | 3/2003 | Cromer et al. | 709/250 |
| 6,535,855 B1 | 3/2003 | Cahill et al. | 705/1 |
| 6,539,361 B1 * | 3/2003 | Richards et al. | 705/35 |
| 6,557,122 B1 | 4/2003 | Sugauchi et al. | 714/57 |
| 6,609,146 B1 | 8/2003 | Slotznick | 709/200 |
| 6,631,409 B1 | 10/2003 | Watson et al. | 709/224 |
| 6,678,826 B1 | 1/2004 | Kelly et al. | 726/2 |
| 6,687,750 B1 | 2/2004 | Messinger et al. | 709/224 |
| 6,718,376 B1 | 4/2004 | Chu et al. | 709/223 |

FOREIGN PATENT DOCUMENTS

| | | |
|---|---|---|
| JP | 09-298543 | 11/1997 |

OTHER PUBLICATIONS

"BofA's Talking ATM Will Retrofit at Least 2,500 of its 14,000 ATMs With Talking ATM Technology Developed by Diebold, NCR and the California Council for the Blind," *Card Fax*, v. 2000, n. 51, p. 1, Mar. 15, 2000.

Barthel, Matt, "7,000 ATM Sites for the Disabled? ABA Estimates Bank Renovation Needs Nationwide," *American Banker*, v. 156, n. 157, p. 3(1), Aug. 15, 1991.

"Absolute Beginner's Guide to Networking," Second Edition, M. Gibbs, et al., Chapters 1-15, Nov. 12, 1994.

The Authoritative Dictionary of IEEE Standards Terms Seventh Edition, p. 1031-1032, published Dec. 2000.

Microsoft Press Computer Dictionary Second Edition, p. 205-206, published Jan. 26, 1994.

"Principles of Object Oriented Analysis and Design," James Martin, Chapters 1-18, Published Jun. 1, 1992 (Cover, Copyright Page and Table of Contents).

"Domain-Specific Languages Versus Object-Oriented Frameworks, a Financial Engineering Case Study," A. Van Deursen, 1997, whole article.

ET++SwapsManager: Using Object Technology in the Financial Engineering Domain, Thomas Eggeenscwiller, et al., 1992, pp. 166-177.

Workshop 22: OO Technology in Large Financial Institutions, Chris Laffra, ACM, pp. 213-217, 1995.

JAVA Perks Developer Interest From IS Embedded Systems, Tom Williams, May, 1996, 4 pp.

JAVA Perks Developer Interest in IS to Embedded Systems, Computer Design, May, 1996, vol. 35, No. 6, pp. 32-34.

Workshop 22: OO Technology in Large Financial Institutions, Chris Laffra, ACM, Oct. 1995, 7 pp.

Supplementary European Search Report for Application No. EP 97 91 3679, dated Jan. 17, 2005 (mailing date).

Preliminary Examination Report for Application No. PCT/US97/18702, dated Feb. 17, 1999 (mailing date).

Written Opinion for Application No. PCT/US97/18702, dated Oct. 10, 1998 (mailing date).

International Search Report for Application No. PCT/US97/18702, dated Apr. 27, 1998 (mailing date).

"Principles of Object-Oriented Analysis and Design," James Martin, Jun. 1992, Chapter 10.

Jain, R., et al., "Network Support for Personal Information Services to PCS Users," *Networks for Personal Communications Conference Proceedings*, pp. 1-7, Mar. 16, 1994.

Arcserve v6.5 for Windows NT User Guide, Computer Associates International, Inc., 1993-1997.

"Database Servers and Host DBMSs," *1995 Database Buyer's Guide and Client/Server Sourcebook*, May 15, 1995 (p. 23 of Enclosure).

"Bay Networks Announces Application—Optimized Network Management; Network-System and Service-Level Management Solutions Enable Optimal Application Performance and Availability," *business Wire*, May 26, 1998.

"Network Management: Lucent Technologies Introduces Multi-Vendor Network Management and Services Software for Data Centric Networks (On Vision Management Systems) (Product Announcement)," *Edge, On & About AT&T*, Mar. 22, 1999.

"N.E.T.: New Pacific Carrier Selects N.E.T. Multiservice Network for Managed Network Services," *M2Presswire*, May 18, 1999.

European Search Report for Application No. EP 00 20 3320, dated Aug. 18, 2004.

"Lucent Selects Syndesis NetProvision Activator as Key Component of OneVision Management Systems for Network Operators," Business/Technology Editors, *Business Wire*, New York, Mar. 18, 1999, 1 p.

\* cited by examiner

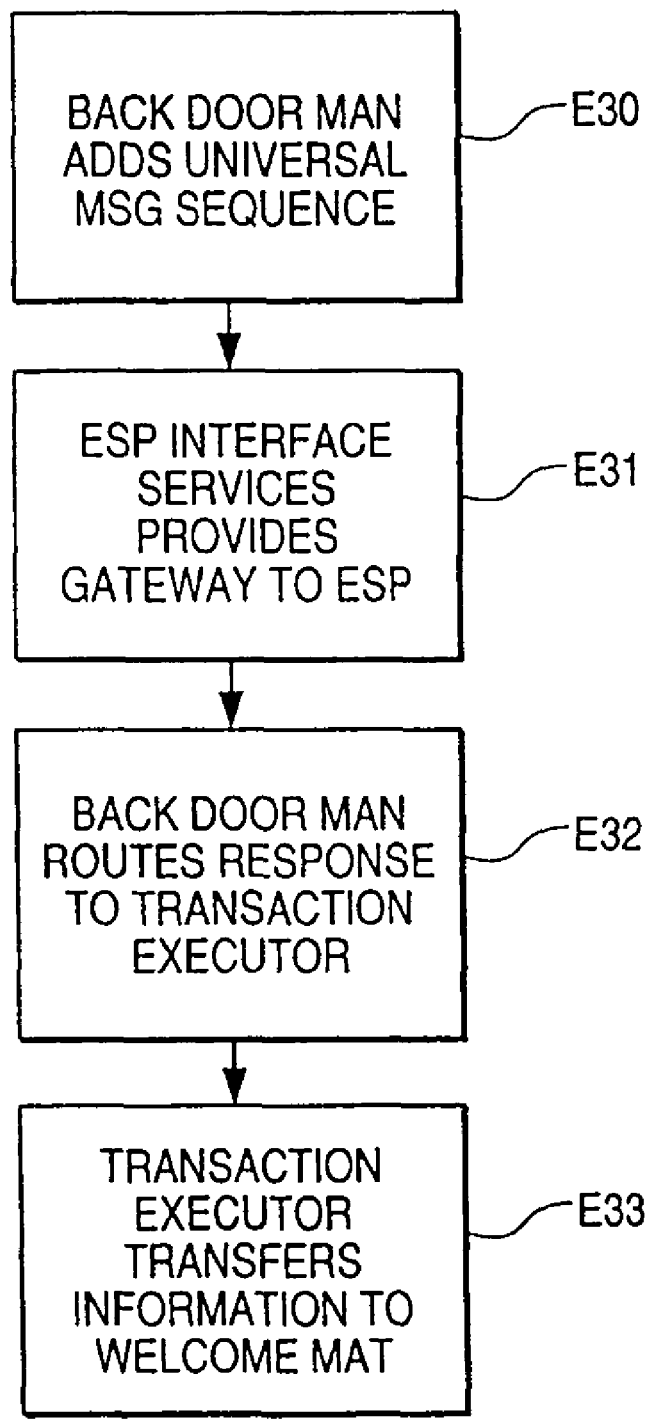

BUSINESS RULES - ACCOUNT DETAILS

| Rule Description | Arguments | Answer | Comments | Appendix Table | Rule name |
|---|---|---|---|---|---|
| 108. What fields are displayed for this product type on screen? | BusinessCode (Relationship Issuer) TransactionType ProductType | MessageElement (ordered list) | For element display order, refer to Table B1 | A7 | gblSIBalances DisplayedForProduct |
| 110. What fields are printed for this product type? | BusinessCode (Relationship Issuer) TransactionType | MessageElement (ordered list) | For element print order, refer to Table B1 | A15 | gblSIBalancesPrinted ForProduct |
| 148. What product types are supported by the transaction type? | BusinessCode (Relationship Issuer) TransactionType | ProductType (list) | | A6 | gblSIProducts |
| 160. What is the balance associated for each linked product? | BusinessCode (Relationship Issuer) ProductType (Linked Products) | ProductType MessageElement | | A9 | gblElementsIn LinkedProducts |
| 518. Which resolver balance is supported for this product? | ProductType TransactionType | MessageElement | | A16 | gblResolver BalanceForProduct |
| 510. What is the phrase describing the balance? | BusinessCode (Relationship Issuer) ProductType MessageElement | | | | From Phrase Database |
| 521. How should balance be displayed if negative? | BusinessCode (Relationship Issuer) ProductType MessageElement | Balance Display:<br>1. Zero<br>2. Display Positive<br>3. Do Not Display | If no answer is given, a *negative amount* will be displayed with a 'positive text' associated to balance | B1 | gblNegative BalanceDisplay |
| 738. Is PIN reentry required? | BusinessCode (Relationship Issuer) TransactionType | PIN choices<br>1. Yes (Always)<br>2. No<br>3. Yes (Except in 1st transaction) | | A8 | gblSIReEntryPIN2 |
| 771. For accounts denominated in 'n' currencies, should balances be shown in the other currency? | BusinessCode (Relationship Issuer) | Yes/No | | A8 | gblSIShowBalancesIn OtherCurrencySupport |
| 814. Support paging through multiple accounts of same type? | BusinessCode (Relationship Issuer) ProductType | Yes/No | Not implemented *(Global CAT)* | A8 | gblPageMultiple SameType |
| 155. How should interest rates be formatted for display? | Country | a. Min Digit After decimal separator<br>b. Max Digit After decimal separator | | A31 | gblInterestRate DisplayFormat |

FIG. 13

BUSINESS RULES - WITHDRAWAL

| Rule Description | Arguments | Answer | Comments | Appendix Table | Rule name |
|---|---|---|---|---|---|
| GENERAL RULES | | | | | |
| 104. What product can be the source for withdrawal? | BusinessCode (Relationship Issuer) TransactionType | ProductType (list) | | A6 | gblWDSource Products |
| 108. What balances are displayed for this product type on screen? | BusinessCode (Relationship Issuer) TransactionType ProductType | MessageElement (ordered list) | For element display order, refer to Table B1 (Max of 3 balances) | A7 | gblWDBalances Displayed ForProduct |
| 110. What balances are printed for this product type? | BusinessCode (Relationship Issuer) TransactionType ProductType | MessageElement (ordered list) | For element print order, refer to Table B1 (Max of 3 balances) | A15 | gblWDBalances PrintedForProduct |
| 518. Which resolver balance is supported for this product? | ProductType TransactionType | MessageElement | | A16 | gblResolver BalanceForProduct |
| 521. How should balance be displayed if negative? | BusinessCode (Relationship Issuer) ProductType MessageElement | Balance Display<br>1. Zero<br>2. Display Positive<br>3. Do Not Display | If no answer is given, a *negative amount* will be displayed with a 'positive text' associated to balance | B1 | gblNegative BalanceDisplay |
| 735. What balance is displayed for an Insufficient fund error screen? | BusinessCode (Relationship Issuer) ProductType (Source) | MessageElement (one element maximum) | | A30 | gblBalanceDisplayed ForNSF |
| 738. Is PIN reentry required? | BusinessCode (Relationship Issuer) TransactionType | PIN choices.<br>1. Yes (Always)<br>2. No<br>3. Yes (Except in 1st transaction) | | A8 | gblWDReEntryPIN2 |
| 870. Display screen with double FX information. | BusinessCode (Relationship Issuer) TransactionType | Yes/No | | A8 | gblWDDisplay DoubleFX |
| 821. How long should be allowed for the customer to remove the dispense item? | BusinessCode (Acquirer) TransactionType | TimeLength (in seconds) | | A8 | gblWDCashWait Time |
| DISCLOSURES | | | | | |
| 204. Which disclosure (if any) should be displayed if the withdrawal has FX fees? | BusinessCode (Relationship Issuer) TransactionType | DisclosureID | | A28 | gblWDDisclosureFX SubjectFees |
| 206. Which disclosure (if any) should be displayed if the source of the withdrawal will be treated as a cash advance? | BusinessCode (Relationship Issuer) TransactionType ProductType | DisclosureID | | A28 | gblWDDisclosure CashAdvance |

FIG. 14A

| Rule Description | Arguments | Answer | Comments | Appendix Table | Rule name |
|---|---|---|---|---|---|
| 210. Which disclosure (if any) should be displayed if fees apply to this cash advance? | BusinessCode (Relationship Issuer) TransactionType ProductType | DisclosureID | | A28 | gblWDDisclosure CashAdvanceFee |
| CASH DISPENSING RULES | | | | | |
| 742. What instruments are supported for dispensing? | BusinessCode (Acquirer) | Instrument Type: (list) 1. Cash 2. Traveler's check 3. Manager's check 4. Telephone cards 5. Coupons | | A8 | gblDispenseInstrument |
| 740. What currencies are dispensed? | BusinessCode (Acquirer) | CurrencyCode (list) | | A10 | gblDispensedCurrency |
| 741. What denominations are available for the currency? | BusinessCode (Acquirer) CurrencyCode | Denomination (List) | | A10 | gblDispensed Denomination |
| 744. What is the bill mix for each denomination? | BusinessCode (Acquirer) CurrencyCode Denomination | Algorithm MinimumAmount Algorithm MaximumAmount AlgorithmLimit Percent | | A11 | gblBillMixCriteria |
| 743. What selection amounts are offered to the customer? | BusinessCode (Acquirer) SummaryCategory DenominationAvail CurrencyCode LimitCode InstrumentType | AmountSelection EquivalentAmount Selection (EMU) Format 10,20,40,60,100,200;0 | An entry returned with a value of '0' will display 'Another Amount' Amounts MUST be separated by a semicolon ';' | A11 | gblWDSelection AmountsOffered |
| CURRENCY RELATED RULES | | | | | |
| 723. Is FX allowed? | BusinessCode (Relationship Issuer) TransactionType | Yes/No | | A8 | gblWDAllowFX |
| 724. Is FX displayed on confirmation screen? | BusinessCode (Relationship Issuer) TransactionType | Yes/No | | A8 | gblWDDisplayFX |
| 776. Display transaction amount in equivalent currency (for 'in' currencies) | BusinessCode (Relationship Issuer) TransactionType | 1 Always Display 2 Display only when txn currencies are different and one is an 'in' currency | | A8 | gblWDDisplayAmount InOtherCurrency |

FIG. 14B

| Rule Description | Arguments | Answer | Comments | Appendix Table | Rule name |
|---|---|---|---|---|---|
| 996. Is FX printed? | BusinessCode (Relationship Issuer) TransactionType | Yes/No | | A8 | gblWDPrintFX |
| 308. For Commission Fee:<br>a. Display and print commission fee?<br>b. Display and Print VAT on commission? | BusinessCode (Relationship Issuer) TransactionType | Yes/No<br>Yes/No | | A8 | gblWDCommission FeeAndVAT |

FIG. 14C

Hello
may I help you?

citibank

Per cominciare, inserire la carta nella fessura e ritirarla.

FIG. 15A

SYSTEM AND METHOD FOR DELIVERING FINANCIAL SERVICES

PRIORITY APPLICATIONS

This application claims the benefit of U.S. Provisional Application No. 60/169,982 filed Dec. 10, 1999, entitled "Method And System For Performing A Transaction At A Self-Service Transaction Device Using Configurable Applications (Configurable Applications For Global CAT)," and is incorporated herein by reference.

This application is a continuation-in-part of U.S. patent application Ser. No. 09/323,210 filed Jun. 1, 1999, now U.S. Pat. No. 7,249,344 entitled "System and Method for Delivering Financial Services" which is a continuation of application Ser. No. 08/908,413, filed Aug. 7, 1997, now U.S. Pat. No. 5,933,816, entitled "System and Method for Delivering Financial Services" issued on Aug. 3, 1999.

CROSS REFERENCE TO RELATED APPLICATIONS

This application is related to U.S. application Ser. No. 09/671,422, filed Sep. 27, 2000, entitled "System and Method for Delivering Financial Services," and is incorporated herein by reference.

NOTICE OF COPYRIGHTED MATERIAL IN DISCLOSURE

A portion of the disclosure of this patent document contains material that is subject to copyright protection. The copyright owner has no objection to the facsimile reproduction by anyone of the patent document or of the patent disclosure, as it appears in the Patent and Trademark Office patent file or records, but otherwise reserves all copyright rights whatsoever.

FIELD OF THE INVENTION

1. Field of the Invention

The invention generally relates to a system and method for delivering financial services and, more particularly, to a system and method for delivering financial services to a plurality of different devices.

BACKGROUND OF THE INVENTION

2. Background

Banks and other institutions that provide financial services are facing increased amounts of competition and are being pressured to provide a greater diversity of services to their customers. Not too long ago when customers traveled to the bank to make all of their transactions, the bank could focus on the customer-bank teller interaction to improve the quality of services. The bank could improve the quality of service by staffing a larger number of tellers at peak times and by offering drive through services. Banks developed internal computer systems and provided their tellers with staff terminals so that the bank tellers could access the books of the bank when they were entering customer transactions.

This simplified model of banking, while still in existence, has been greatly expanded. In addition to the bank tellers, banks provide Automated Teller Machines (ATMs) so that customers can perform transactions at literally any hour of the day. The locations of the ATMs are not limited simply at the bank's branch locations but can be found, for instance, in shopping malls, airports, grocery stores, hotels, and building lobbies. Since the ATMs must access the books of the banks to allow customers to perform their transactions, banks had to provide an interface between the ATMs and the bank's internal computer system that allows the ATMs limited but secure access to the bank's books.

The model for providing financial services has been expanded even further to enable home banking. With home banking, a customer can access his or her personal account and perform transactions, such as bill paying, money transfers, etc., in the convenience of one's home through the customer's personal computer. To enable home banking, banks had to provide an interface between the bank's internal computer system and the customer's personal computers to allow limited and secure access to the bank's books. Due to the differences between ATMs and personal computers, the interface for the personal computers is typically separate and distinct from the interface provided for the ATMs.

One difficulty facing banks is that they must provide a first interface between the bank's internal computer system and the staff terminals, a second interface between the internal computer system and the ATMs, and a third interface between the internal computer system and the personal computers. Each of these interfaces or platforms adds complexity to the bank's overall computer system and each competes with the other for access to the bank's books. This added complexity is significant since the amount of resources that the bank must devote toward maintaining its computer system is increased due to these three separate platforms.

The complexity of a bank's computer system will only grow as banks continue to provide more and more services. One area of service that banks are already beginning to explore is the granting of access to the bank's books by devices other than personal computers, such as screen phones or personal data assistants (PDAs). Another area of service that banks are contemplating is the granting of access to the bank's books through the Internet, such as through an Internet service provider (ISP) or other external service provider (ESP). These additional remote devices and the connection to the ISP would further complicate the bank's internal computer system and would require the bank to devote more resources in maintaining and upgrading its computer system.

In addition to additional channels of access to the bank's books, banks have been expanding the types of services that can be accessed by a remote device. In addition to traditional checking and savings accounts transactions, banks are also enabling the paying of bills, the buying and selling stocks, the quoting of stocks, as well as other types of services through the ATMs, personal computers, or other remote devices. Each expansion into another type of service requires a significant amount of modification to the software and possibly hardware in the bank's internal computing system. These additional services, although necessary to remain competitive, require a considerable amount of work on the bank's computer system.

The complexity in offering financial services will also be compounded as more and more services are being provided in an international market. As individual national markets in the world continue to merge together, both businesses and individual customers will have an increased need and desire to access their account information from another country. The platform or platforms needed to interface with the banking systems of other countries will further tax the ability of a bank to maintain its computer system and its books.

Another difficulty facing a bank entering another country is that the bank must, in effect, create a new computer system for each country that it enters. Each country has its own unique regulatory and legal environment which dictates the manner in which financial services must be performed. The bank cannot simply duplicate a computer system operating in another country but rather must specially tailor each computer system to the regulatory and legal environment of that country. This extra amount of effort required to shape a computer system according to the rules and laws of its home country consumes more of the bank's valuable resources.

The creation of computer systems for banks in other countries is complicated by the difference in languages. Because of a language difference, the interface between the computer system and the customer, such as through a graphical user interface (GUI), will vary according to the national language or languages of a particular country. These differences in how customers interface with the bank's computing system is not limited simply to words and different alphabets but also encompass manifestations of language due to differences in culture or norms of a particular country. These manifestations of language, for instance, may dictate the selection of certain colors in a GUI, the use of a particular set of symbols, and the selection of certain audio indicators, such as beeps or other tones.

In view of a desire to allow international access to the bank's books, each computer system should also be able to receive and send communications from the other computer systems, which possibly may be in numerous languages. For instance, the bank's books which are stored in the United States may need to be accessed by a newly installed banking system in Thailand. Before this access is possible, however, the banking system in the United States may need to be modified to recognize the bank's computer system in Thailand. Consequently, with the introduction of each computer system in one country, the computer systems in all of the other countries may need to be modified accordingly.

As discussed above, banks are increasingly providing new types of access to the bank's books and are providing new services in an ever-increasing number of countries. All of these changes in services and access to services are accomplished by rewriting the application which governs all operations of the bank's internal computer system. Due to the extremely sensitive nature of the data in the bank's books and the need for total accuracy, any modification to this application must undergo an inordinate amount of testing. Since the application covers all aspects of the system, any modification to one part of the application which may cover only a minor aspect of the system can potentially have an effect on any other part of the system. The testing required for any modification, even for just a minor upgrade, must therefore be performed on the entire system.

Thus, a need exists for a computer system or method that has a reduced amount of complexity yet offers access to various remote devices and enables the expansion of access to new types of devices. A need also exists for a computer system or method that can offer new or modified services more easily with less testing. A need also exists for a computer system or method that can more easily accommodate the legal and regulatory environment of a host country and which can more easily interconnect and communicate with the systems in other countries. A need also exists for a computer system or method that globally configures a user-friendly interface between the remote device and the customer using the customer's account profile, various languages, various currencies, different legal regulatory requirements, as well as, different sets of business products.

SUMMARY OF THE INVENTION

The invention, in a preferred embodiment, is a system and method for delivering financial services to a remote device. Through the remote device, a customer or employee of a financial institution can select a mini-app dialog component to perform a function. Preferably, each function that may be performed is represented by a separate mini-app dialog component. Upon selection of a function, the mini-app dialog component collects information needed to perform the requested function and instantiates a transaction executor component to carry out the function. The remote device may comprise any type of device, such as a personal computer, screen phone, ATM, personal data assistant, or an internal staff terminal. The remote device may access the system in a variety of ways, such as through an external service provider, through the Internet, or through dial-up access. Thus, the system provides a single base for interfacing with all types of remote devices.

In generating graphic interfaces, the system and method preferably separate content from format to accommodate variations in the remote devices. The system includes a presentation manager which maps messages from a canonical representation into the format desired for a particular remote device. The content of the messages is regulated through a language man component. In response to a request for a named phrase, the language man component provides the phrase in the language and the content specific for that customer and that remote device. As a result, the system and method can provide state of the art user interfaces, can provide interfaces consistent for a financial institution, and can allow a customer to custom design a user interface.

In providing state of the art user interfaces, the system and method makes use of a global base of software that includes a standard set of mini-applications, such as withdrawal, deposit, transfer, and the like, that is able to configure itself dynamically to meet both the needs of the different countries and the different customers within a particular country. For example, for an "on-us" customer (e.g., a local customer of the financial institution in Spain), the "on-us" customer can be treated with one set of user interfaces (e.g., ATM screens) and an "off-us" customer (e.g., a customer from an unrelated financial institution) can be treated with a different set. The system and method dynamically configure the user interface using customer information (e.g., information read on the card dip) and using information associated with the country in which the remote device is deployed (e.g., location of an ATM) and information associated with the country and business in which the customer's account is maintained.

The system and method operate in sessions with a session bubble instantiated for each session with a remote device. After receiving an initial contact with a remote device, a session controller instantiates a session component to manage resources for the session bubble. The session component, in turn, instantiates a number of components for the session, such as a welcome mat component, front door man component, rule broker component, and acquirier component. The welcome mat component sends a logon message to the remote device and instantiates a profile transaction executor component to authenticate a customer. A navigation shell component notifies the remote device of the list of available functions, such as cash withdrawal or bill payment, and instantiates a mini-app dialog component based on the function selected through the remote device. To coordinate communications with the plural sessions that may occur simultaneously, a touch point interface component routes incoming messages from remote devices to the appropriate session bubbles and a back door man component coordinates messaging between the various sessions and an external service provider.

The system and method employ a rule broker component that other components within the system may query to obtain an answer to any question that might arise. The rule broker component registers rule authorities as the answerers of questions and directs the querying component to the rule authority for the answer. The rules within the system and method may be modified independently from other application components. With the rule broker, regulatory or business rules can be easily added, changed, or modified with only a minimal impact on overall operations.

The system and method are operable in conjunction with any legacy application that may already exist. A legacy app bridge component converts data from a canonical representation to the global data structure needed by the legacy applications. On an exit from a legacy application, the legacy app bridge component translates the data from the legacy application into the canonical representation. The legacy app bridge component therefore enables the continued operation of the legacy applications.

It is therefore an object of the present invention to provide a delivery system and method that provide a common application base for all remote devices.

It is also an object of the present invention to provide a delivery system and method that provide a set of re-usable components that can be easily modified or expanded to fit the needs of a particular environment.

It is another object of the present invention to provide a delivery system and method that provide and can easily maintain state of the art user interfaces.

It is a further object of the present invention to provide a delivery system and method that reduce development and maintenance cycle time.

It is yet another object of the present invention to provide a delivery system and method that are capable of supporting existing remote devices having legacy applications.

It is another object of the present invention to provide a delivery system and method for performing a transaction at a remote device using a configurable common application base that enables a financial institution to make a globally consistent offering for all customers whether at home or traveling.

It is another object of the present invention to provide a delivery system and method for performing a transaction at a remote device using a configurable common application base that provides a user interface that enhances the experience of customers and provides a consistent presentation around the world.

It is another object of the present invention to provide a delivery system and method for performing a transaction at a remote device using a configurable common application base that facilitates offering new functionality and features worldwide through leveraging the customer's account profile, various languages, various currencies, different legal regulatory requirements, as well as, different sets of business products.

These uses may be accomplished singularly, or in combination, in one or more of the embodiments of the present invention.

BRIEF DESCRIPTION OF THE DRAWINGS

FIGS. 5A to 5D are flow charts depicting operations of the delivery system in authenticating a customer.

FIG. 13 is a table of exemplary Global CAT-defined business rules for an inquiry into account details in an embodiment of the present invention.

FIGS. 14A-C are tables of exemplary Global CAT-defined business rules for a withdrawal in an embodiment of the present invention.

FIGS. 15A-D illustrate Global CAT screens that a customer views, inputs, selects, and/or transmits transaction information to the remote device in an embodiment of the invention.

DETAILED DESCRIPTION OF THE PREFERRED EMBODIMENT

Figure 1:
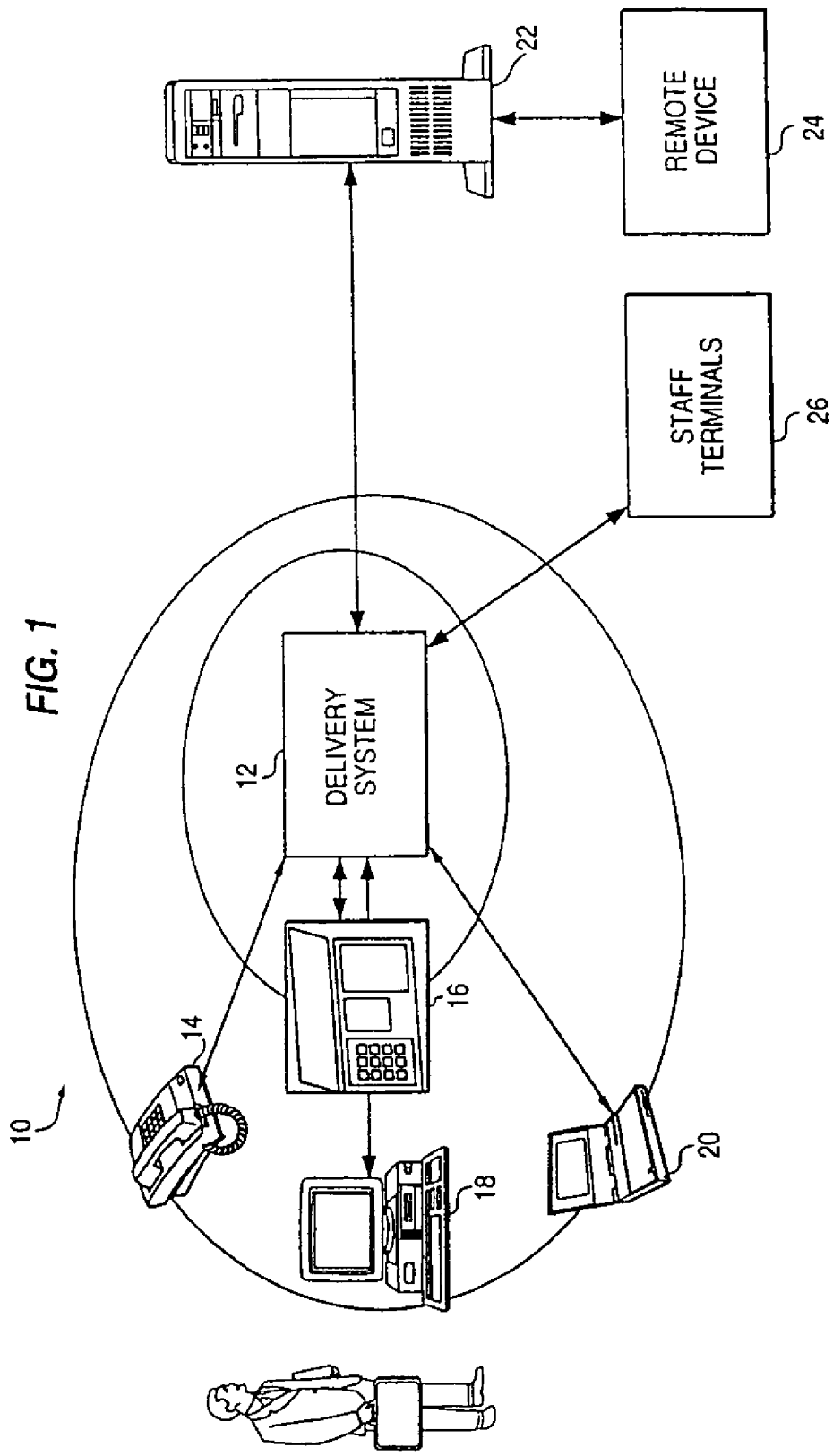
FIG. 1 is a diagram of a delivery system according to a preferred embodiment of the invention connected to a plurality of remote devices.

Reference will now be made in detail to the preferred embodiment of the invention, an example of which is illustrated in the accompanying drawings. The invention is described with reference to a system 10 for use by a bank, although the system 10 may be employed by any type of institution offering financial services. The financial system 10 includes a delivery system 12 for providing financial services to a variety of remote devices. These remote devices include a screen phone 14, an automated teller machine (ATM) 16, such as Citibank's CAT/CASST terminals, a personal computer 18, or a personal data assistant (PDA) 20. The remote devices can practically be any type of device and can be installed with any suitable software for communicating with the delivery system 12, such as a standard web browser or any other third party software product. The remote devices that the delivery system 12 can provide financial services to is therefore not limited to any particular class or type of remote device but instead may include any future device or system. Further, the delivery system 12 provides services not only to customers of a financial institution but may also provide services internally to the institution, such as at staff terminals 26.

The delivery system 12, furthermore, provides financial services over a plurality of different delivery networks. As an example, the delivery system 12 may deliver financial services to the screen phone 14, personal computer 18, or PDA 20 via dial-up access or through an application server, such as the home services delivery system (HSDS), which is disclosed in U.S. Pat. No. 5,485,370 to Moss et al. and which is hereby incorporated by reference. Alternatively, the delivery system 12 may provide financial services to remote devices 24 through an Internet Service Provider (ISP) 22 or an on-line service provider 22, such as through the Internet or World Wide Web. The delivery system 12 advantageously is able to provide financial services over a variety of communication paths, such as the Internet, a land-line telephone network, a cellular network, or a cable network, and can be easily modified to operate over new transmission paths or new transmission protocols.

I. Service Sets and Components

Figure 2:
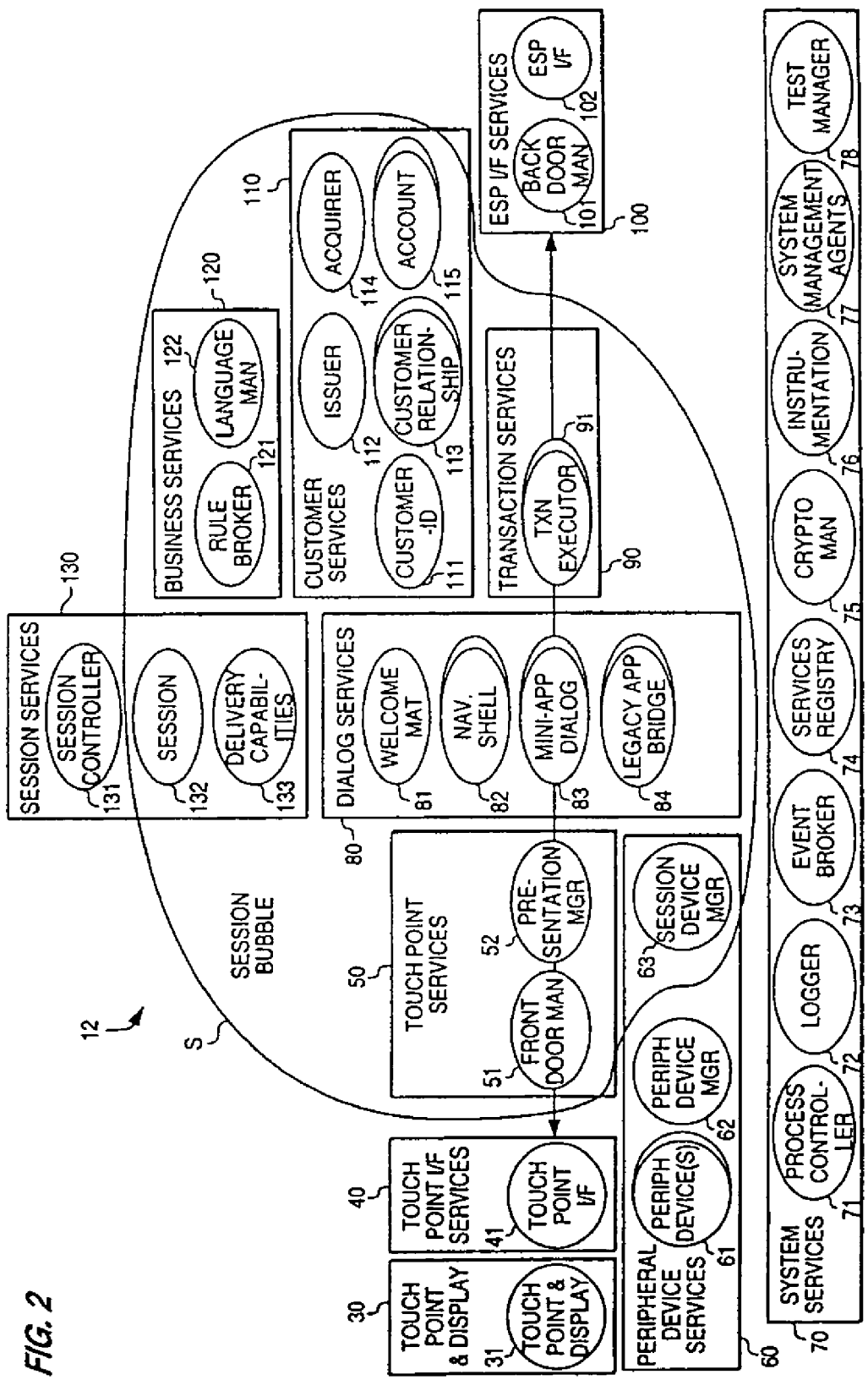
FIG. 2 is an overall block diagram of the delivery system of FIG. 1.
Figure 3A:
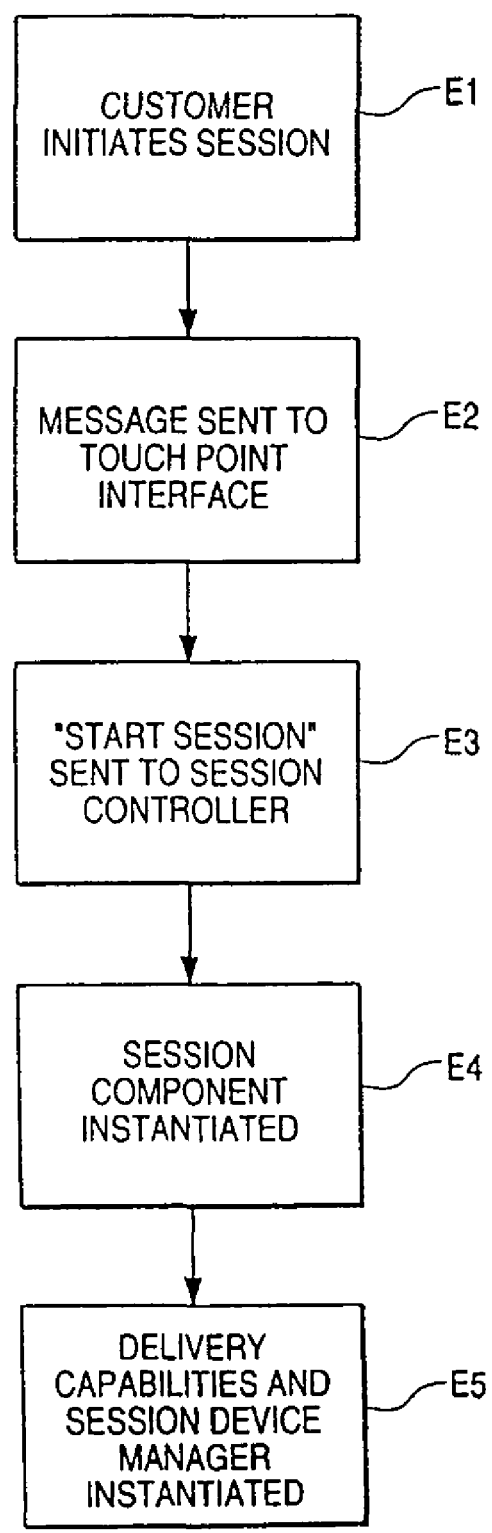
FIGS. 3A to 3C are flow charts depicting operations of the delivery system in starting a banking session.
Figure 3B:
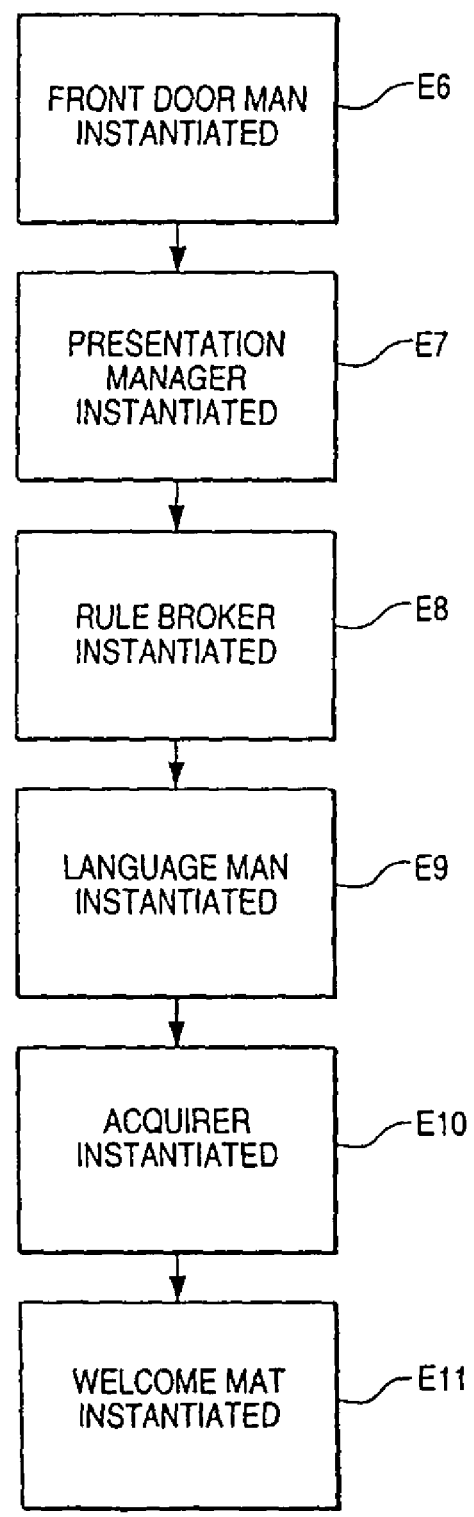
Figure 3C:
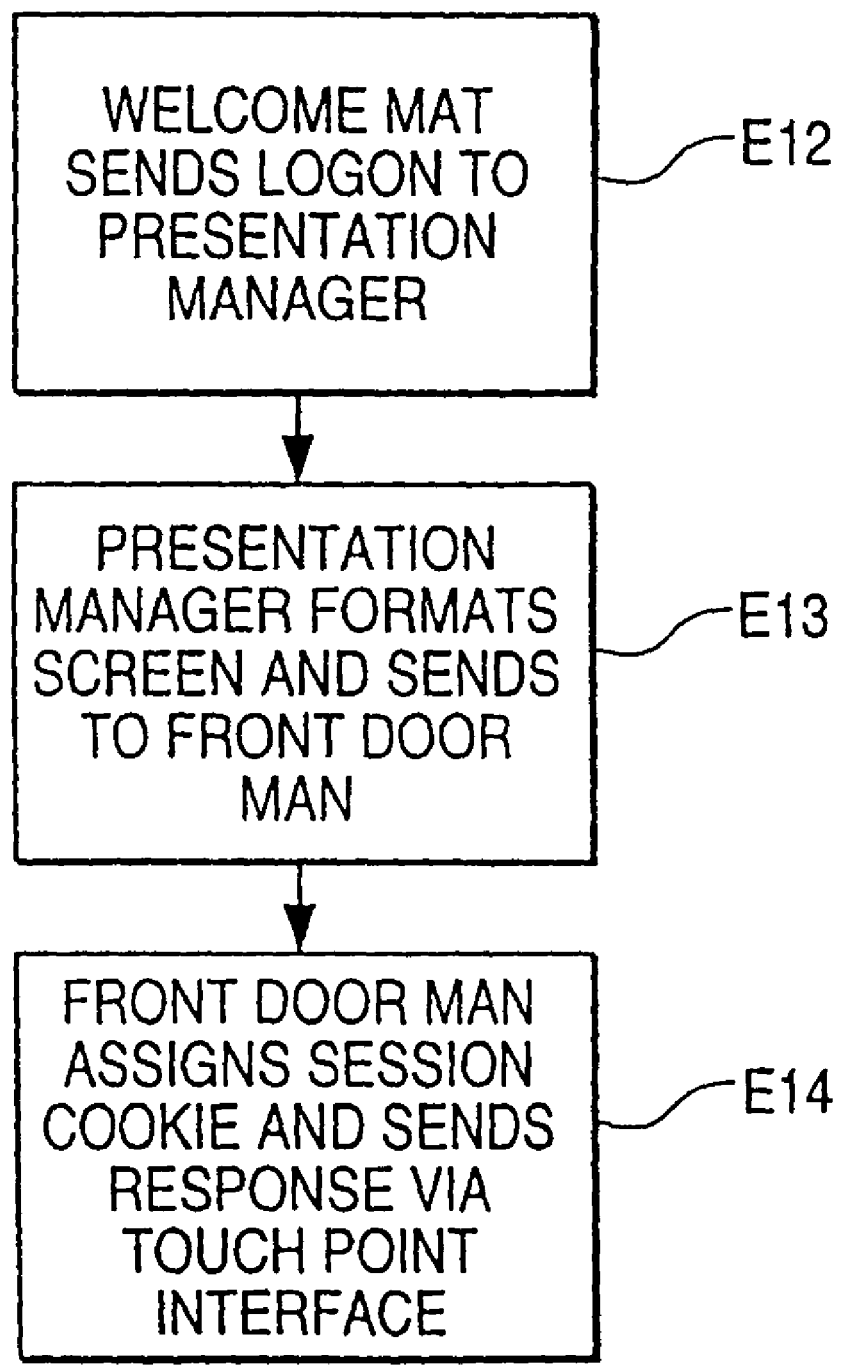
Figure 4A:
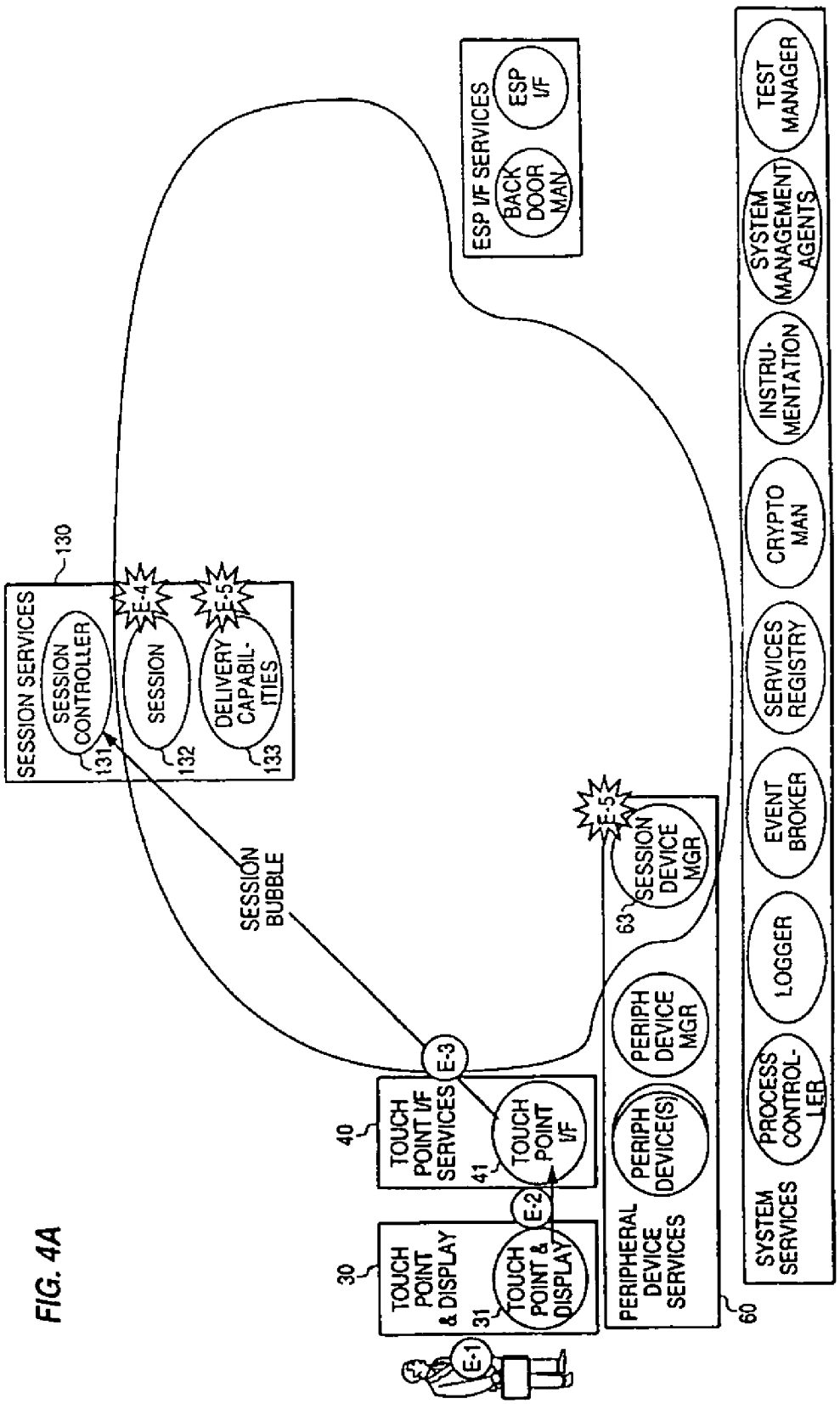
FIGS. 4A to 4C are partial block diagrams of the delivery system depicting the operations shown in FIGS. 3A to 3C.
Figure 4B:
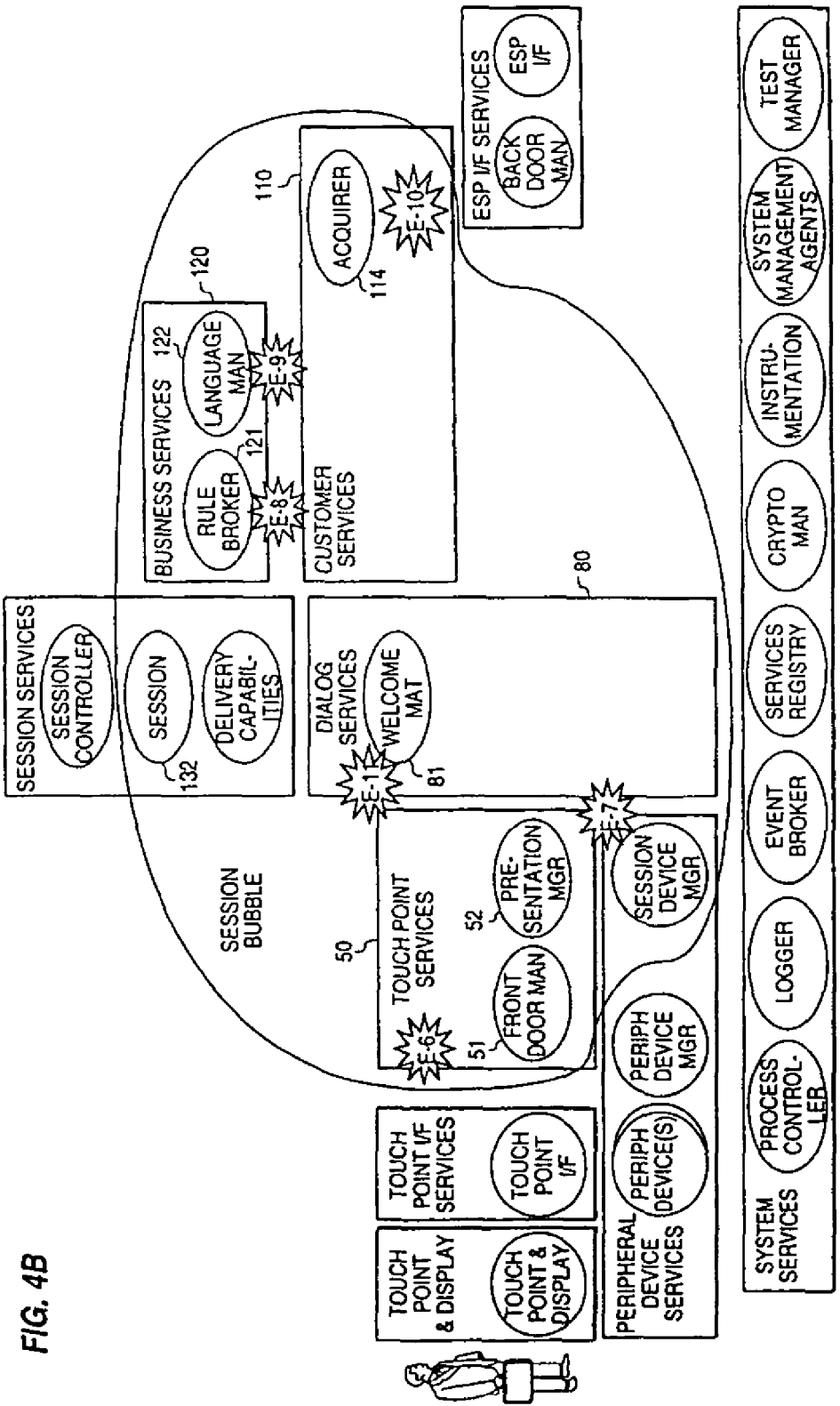
Figure 4C:
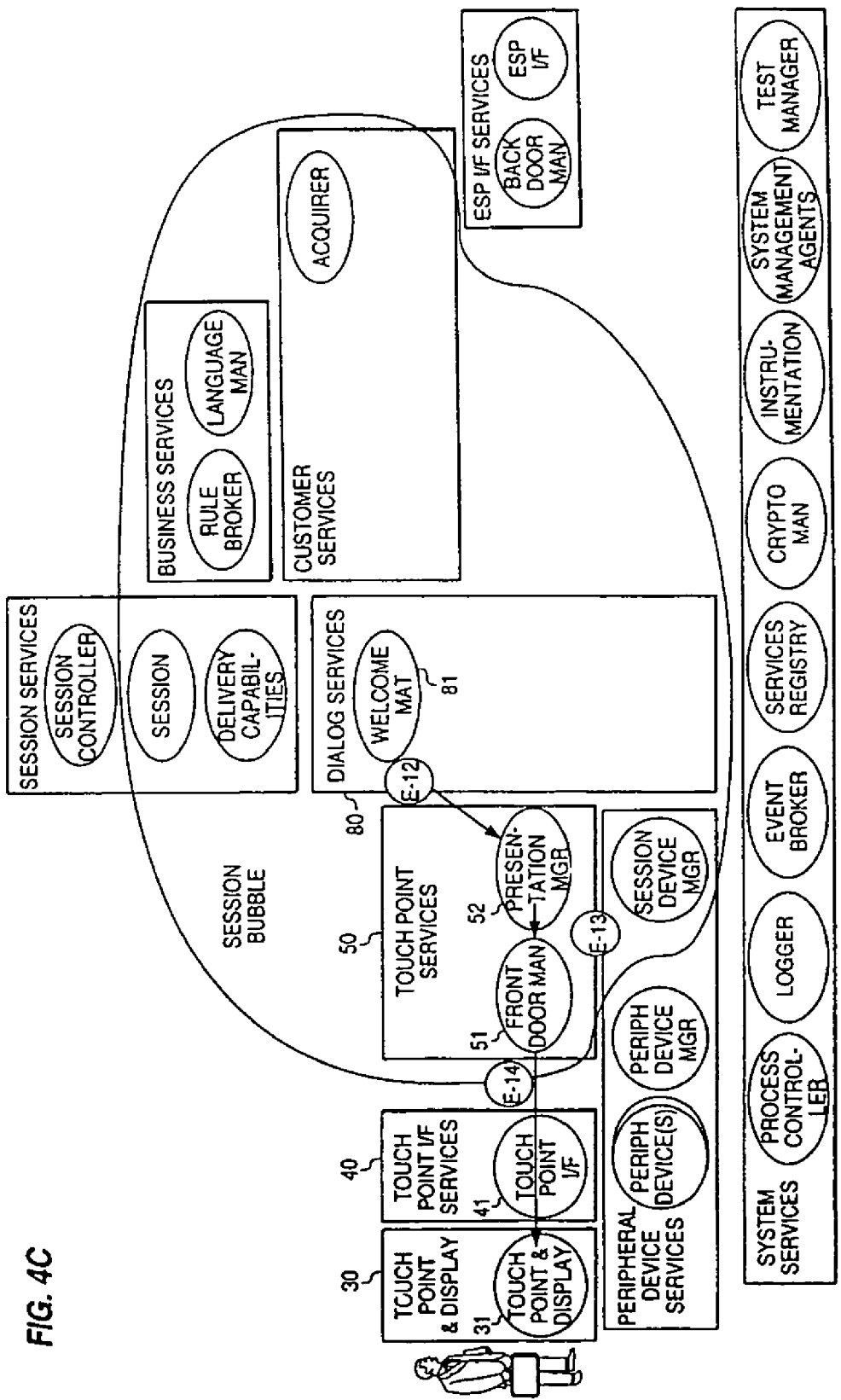
Figure 5A:
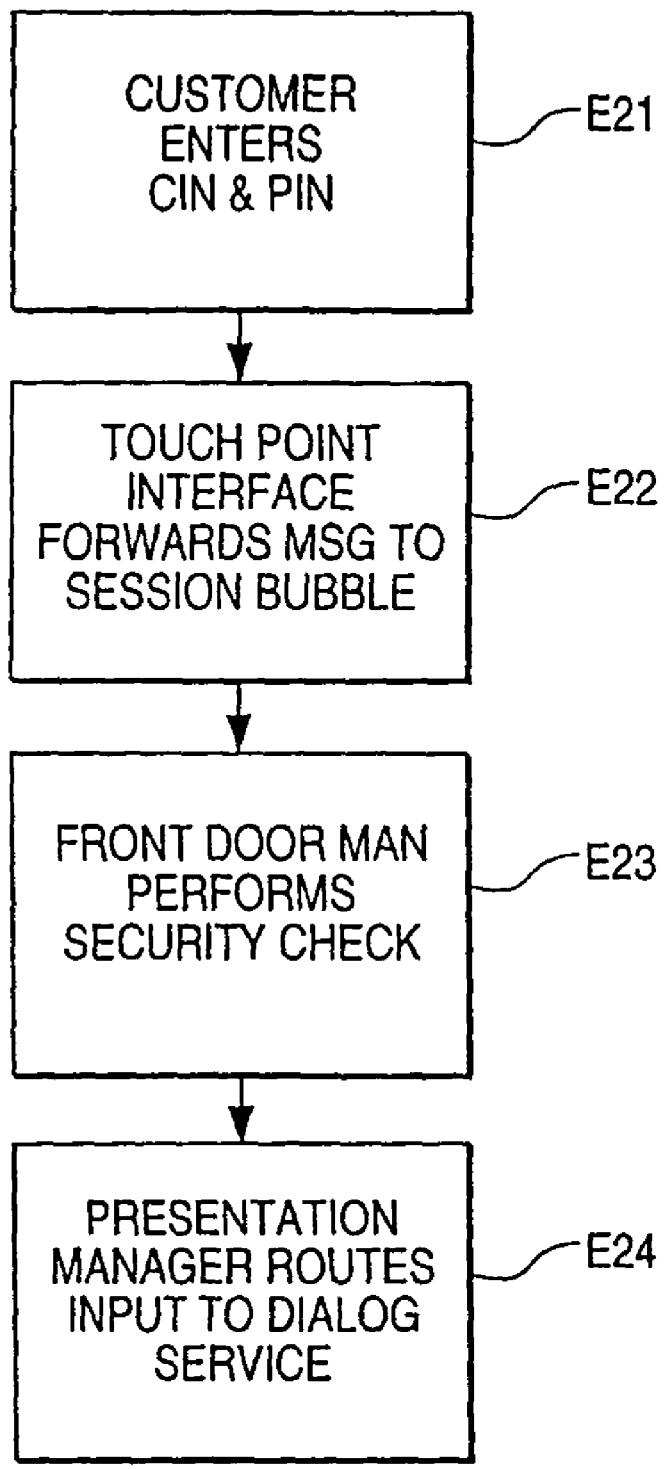
Figure 5B:
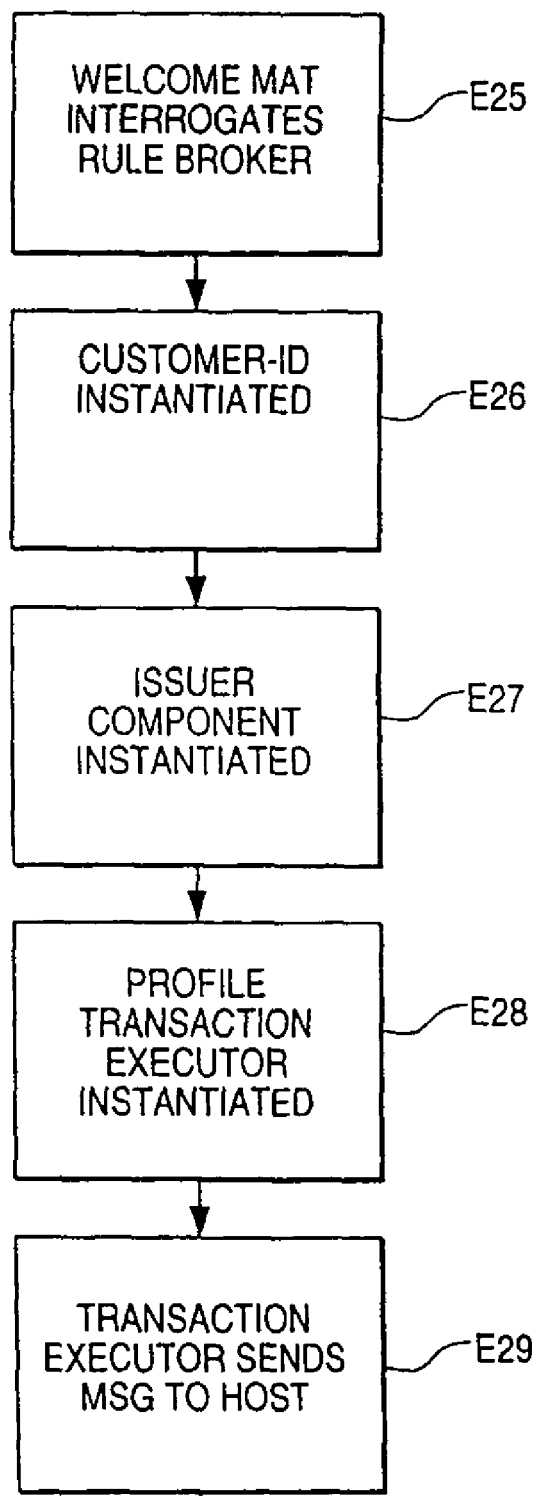
Figure 5D:
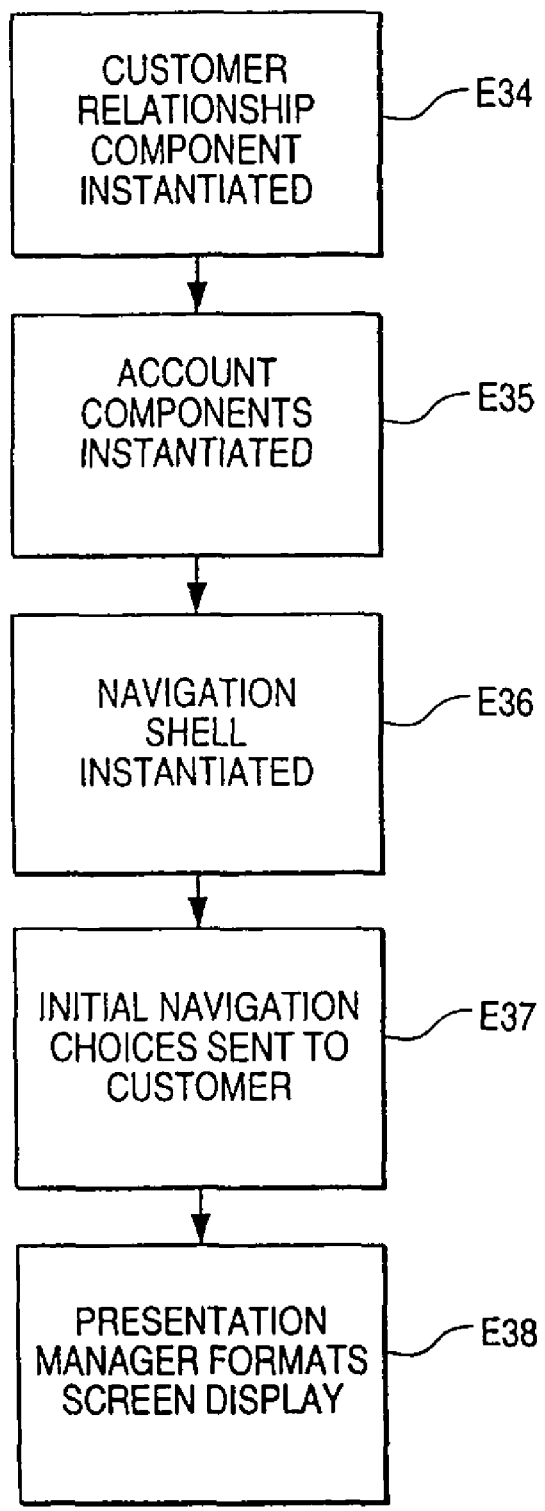
Figure 6A:
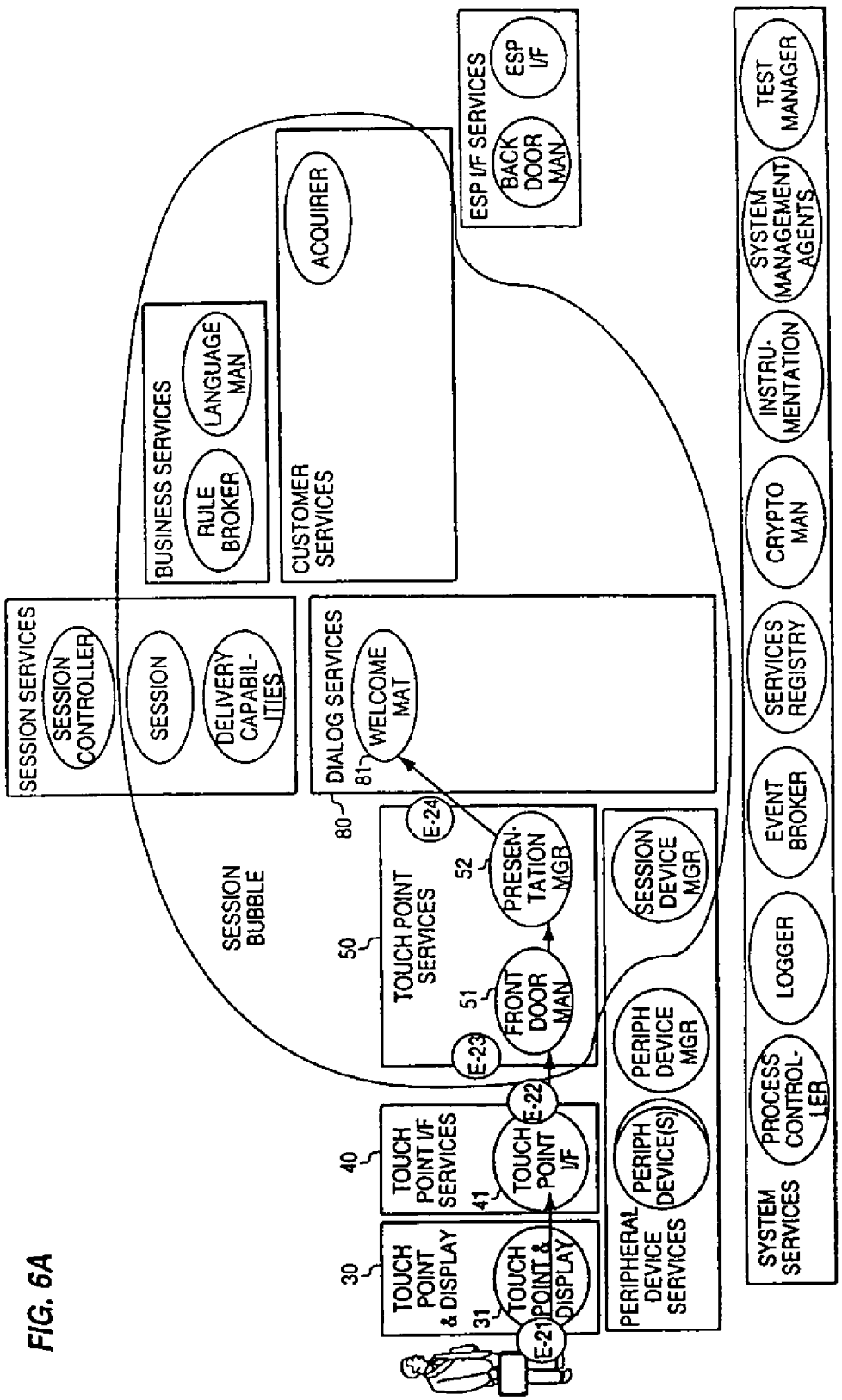
FIGS. 6A to 6C are partial block diagrams of the delivery system depicting the operations shown in FIGS. 5A to 5C.
Figure 6B:
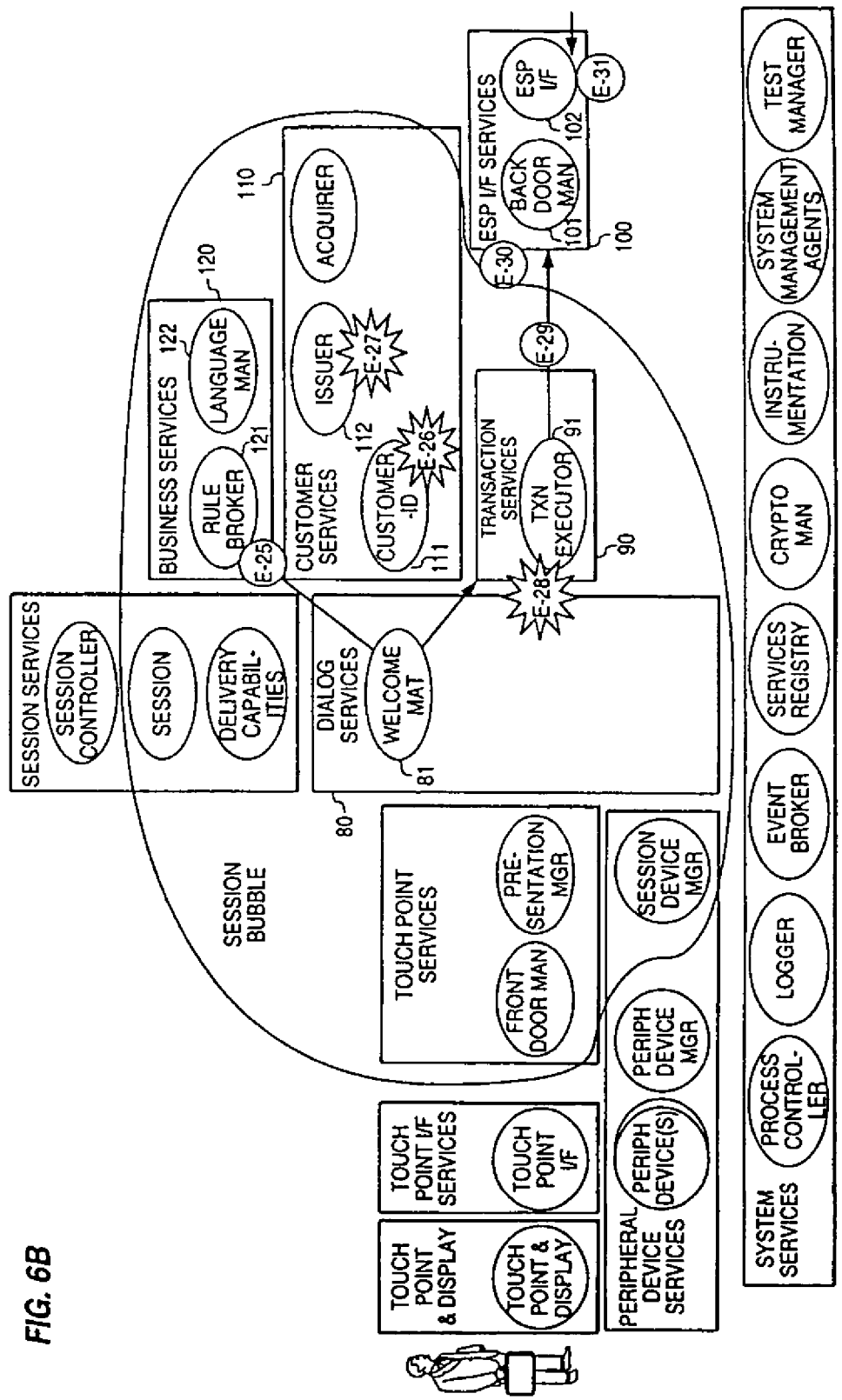
Figure 6C:
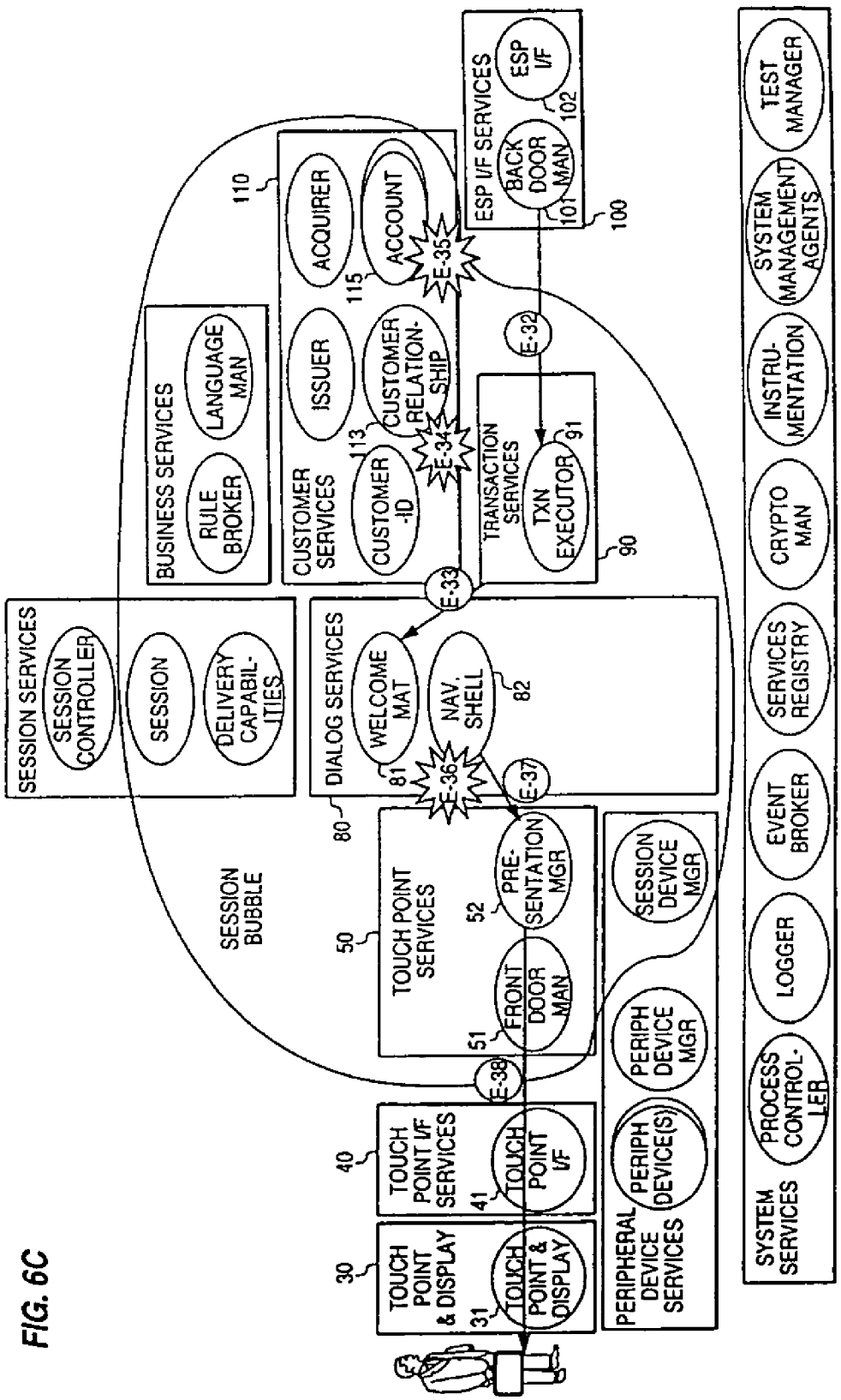
Figure 7A:
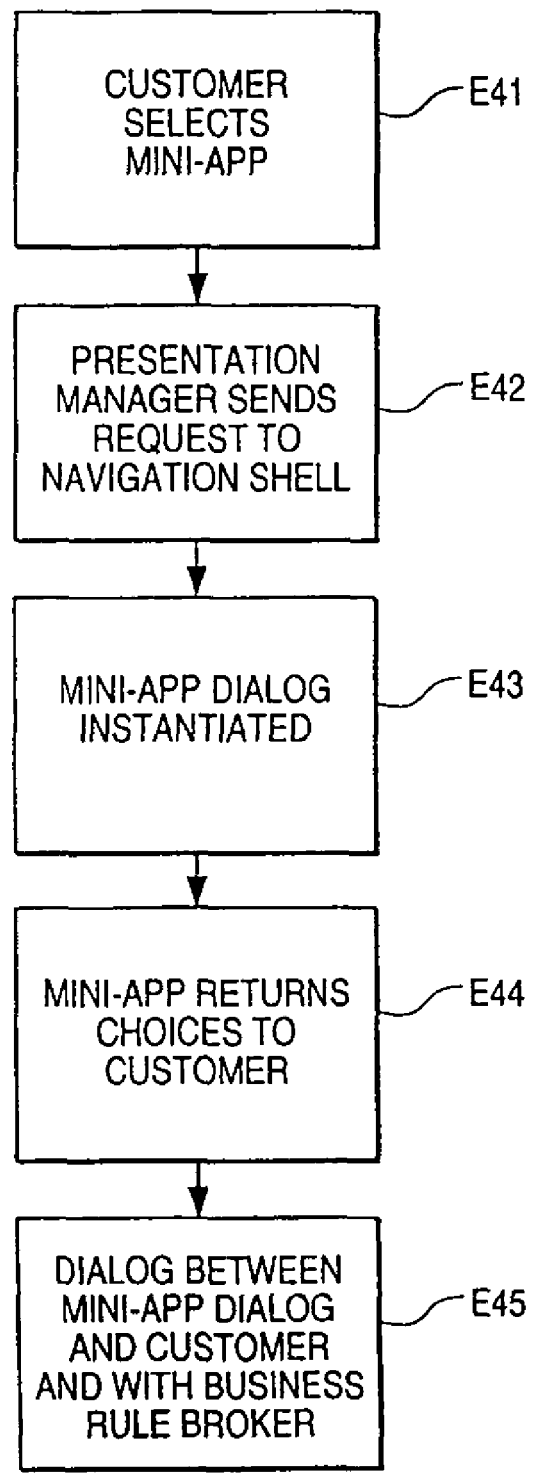
FIGS. 7A and 7B are flow charts depicting operations of the delivery system in the selection of a mini-application by a customer.
Figure 7B:
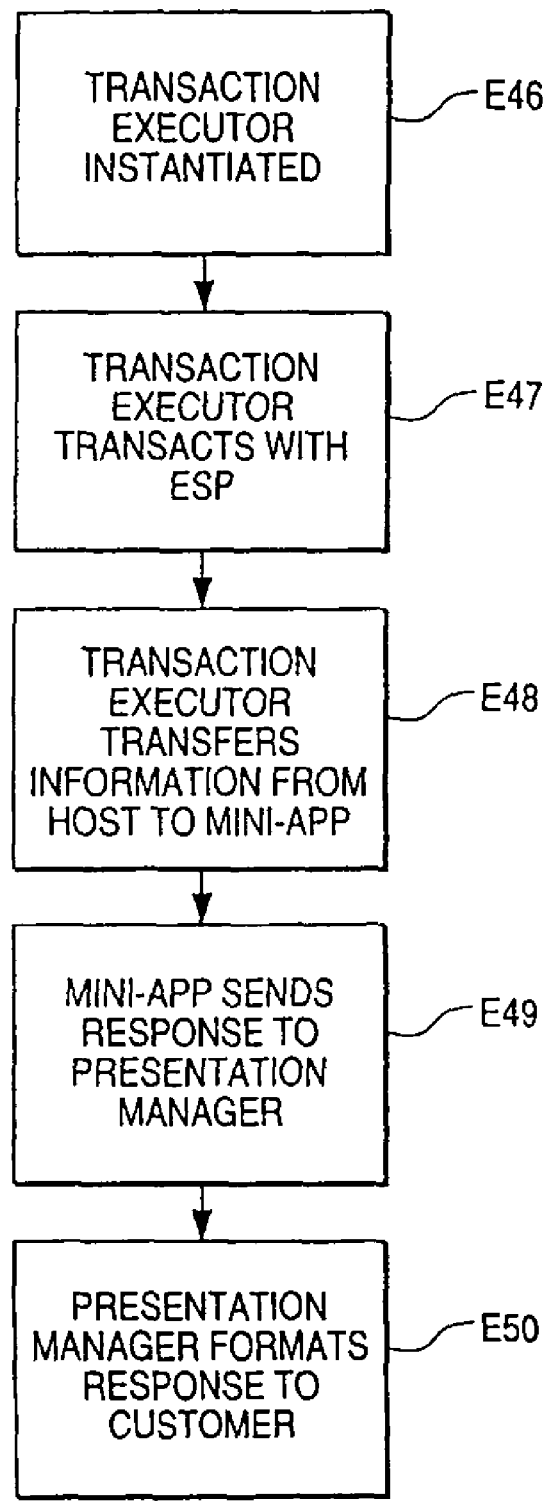
Figure 8A:
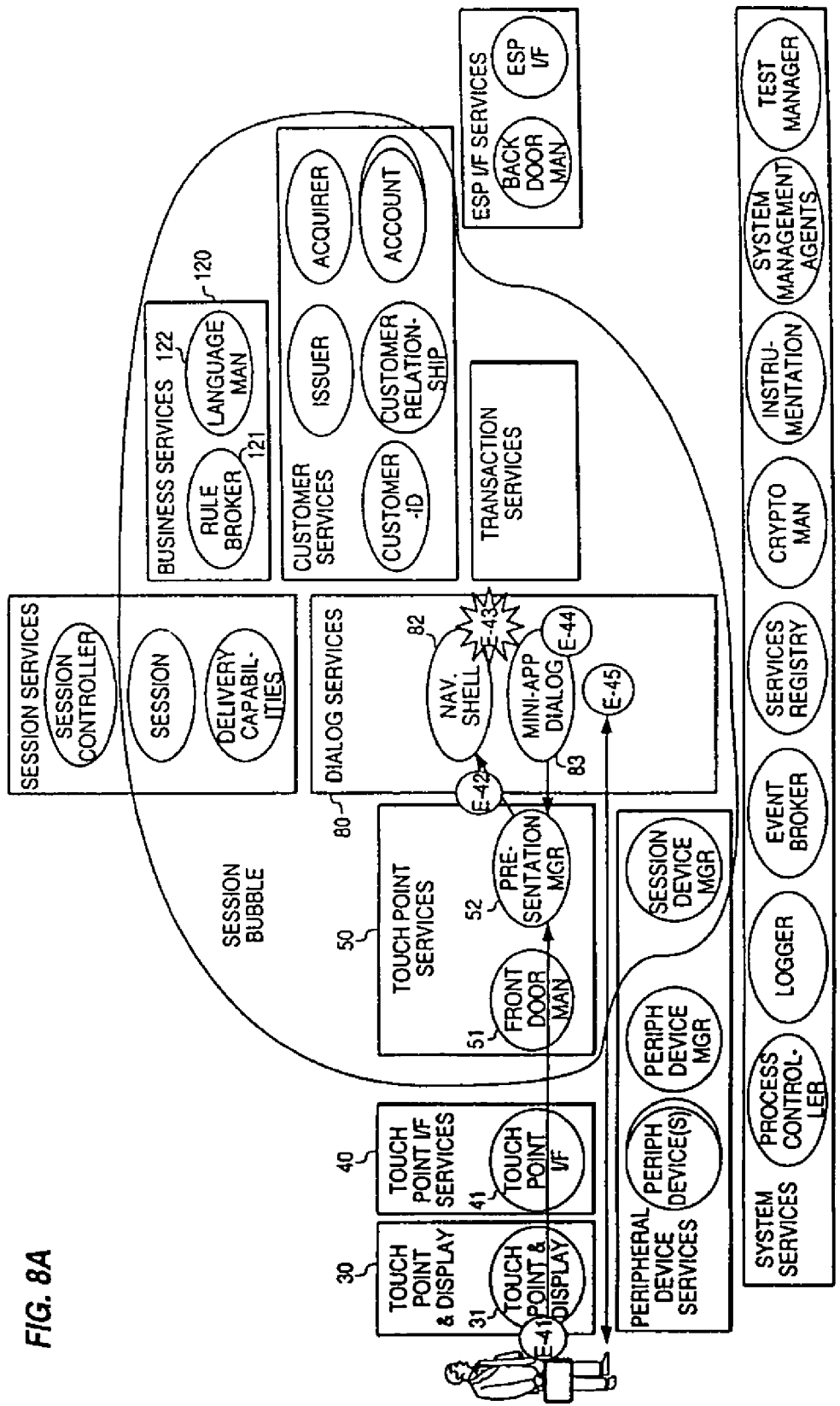
FIGS. 8A and 8B are partial block diagrams of the delivery system depicting the operations shown in FIGS. 7A and 7B.
Figure 8B:
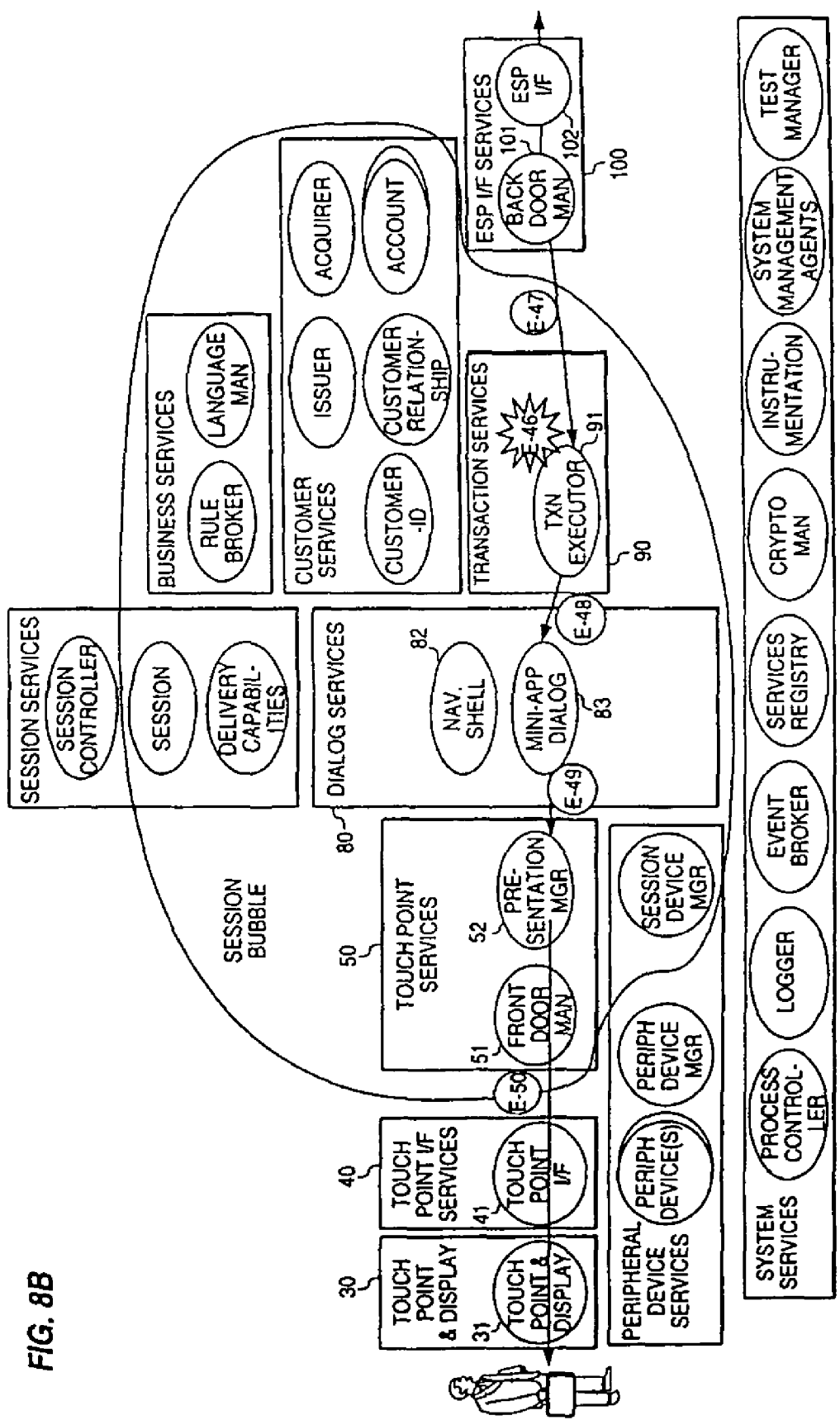

With reference to FIG. 2, a delivery system 12 according to a preferred embodiment of the invention comprises plural sets of service components. These sets of service components include a touch point and display set 30, a touch point interface services set 40, and a touch point services set 50. In general, the touch point and display set 30 provides actual customer display and input facility and the touch point interface services set 40 provides an interface to the touch point services set 50. The touch point services set 50 provides presentation mapping and front door security for the delivery system 12. The delivery system 12 also includes a peripheral device services set 60 providing peripheral device interface and management services. A system services set 70 provides logging, event brokering, service registry and crypto services and a dialog services set 80 provides welcoming, navigation shell and application specific dialogs. A transaction services set 90 provides transaction coordination and ESP message formatting and an external service provider interface services set 100 provides message sequencing and ESP interface protocols. A customer services set 110 provides customer identification, relationship, account and issuer services and a business services set 120 provides rule brokering, language, and acquirer services. A session services set 130 provides session start up and session and delivery vehicle context.

A. Touch Point and Display Set 30

The touch point and display set 30 provides the actual customer display and input facility on the remote device. The touch point and display set 30 includes a touch point and display component 31 that displays pages on the remote device screen and sends customer inputs to the delivery system 12. The touch point and display component 31 is responsible for managing the link/session level protocols with an application server on the remote device. The touch point and display component 31 also decodes the server interface protocol and outputs a page to the local screen of the remote device. The touch point and display component 31 acquires customer inputs, including choice selections and forms input, encodes the input in the server interface protocol, and sends the customer input to the touch point interface set 40. For Internet sessions with the delivery system 12, the touch point and display component 31 preferably comprises a web browser that handles protocols such as TCP/IP, HTTPS, and, less preferably, FTP.

B. Touch Point Interface Services Set 40

The touch point interface services set 40 provides an interface to the touch point services set 50 and includes a touch point interface component 41. The touch point interface component 41 is responsible for managing the link/session level protocols with a remote device. The touch point interface component 41, for instance, notifies the session services set 130 to start a new session on initial contact from a remote device. The touch point interface component 41 also encodes messages in the interface protocol, sends messages to the touch point services set 50, and decodes messages received from the touch point services set 50. The touch point interface component 41 further routes received messages to an appropriate session front door man component 51 of the touch point services set 50. For Internet sessions with the delivery system 12, the touch point interface component 41 preferably comprises a web server which handles the protocols such as TCP/IP, HTTPS, and, less preferably, FTP.

C. Touch Point Services Set 50

The touch point services set 50 is responsible for final device specific presentation layout and front door security and includes the components of the front door man component 51 and a presentation manager component 52. The front door man component 51 guards access of a remote device into a session. For remote sessions, the front door man component 51 adds a session security token to outgoing messages and verifies the session security token for incoming messages. For sessions with a CAT/CASST 16, the front man component 51 may simply pass through communications. Although the front door man component 51 has been shown as a single component, the front door man component 51 preferably comprises a separate component for each type of remote device.

The presentation manager component 52 is responsible for mapping a canonical representation of information on pages into a specific style layout in a device specific presentation format. Thus, the same application can have different presentation styles on different device types. For instance, the same application may have different presentation styles depending on whether the application is displayed on a personal computer 18, a PDA 20, a screen phone 14, a CAT 16, a third party kiosk terminal, or another type of remote device. The style templates can be customized by region to support local cultural differences in areas such as color schemes, graphics, icons, and font sizes. The presentation manager component 52 maps tagged phrases and data from the application into specific fields of a particular page template referenced by the application. A template controls the layout and representation of frames on a page, multi-media elements, choice and data fields, and input forms on the page for a specific style and device type. The presentation manager component 52 also encodes the resulting page in the device specific format for the particular remote device and sends the page to the front door man component 51. The presentation manager component 52 also receives incoming messages from the remote device, converts choice information and form fields from the device specific format to a tagged canonical representation, and routes the representation to the appropriate component within the dialog services set 80. The presentation manager component 52 uses delivery system specific templates to enforce consistent layout styles across pages having similar choices, data fields, and forms. A template can be the superset of all possible objects on a page since the presentation manager component 52 can "drop out" fields and choices which are not associated with any data. Reference is made to a related application Ser. No. 08/741,121, "Method and System for Automatically Harmonizing Access to a Software Application Program Via Different Access Devices," filed Oct. 30, 1996 which is incorporated herein by reference.

D. Peripheral Device Services Set 60

The peripheral device services set 60 is responsible for handling application requests for peripheral device services and for managing the software components that handle such requests. Peripheral device services set 60, for instance, provides a custom high-level application interface to peripheral devices associated with a remote device, such as the CAT/CASST 16. The peripheral device services set 60 includes a peripheral device handler component 61, a peripheral device manager component 62, and a session device manager component 63.

The peripheral device handler component 61 represents and controls a specific kind of connected peripheral hardware device. Several kinds of peripheral devices may be connected to a service delivery platform for the CAT/CASST 16. The peripheral device handler component 61 preferably comprises a plurality of peripheral device handler components 61 with each peripheral device handler component 61 providing a generic device management interface and a specific service interface. Further, the peripheral device handler component 61 is not limited to a single component, but may comprise specific subcomponents to interface with its associated peripheral hardware device. The peripheral device handler component 61 loads and activates needed subcomponents and initializes the specific peripheral device hardware. The peripheral device handler component 61 maintains persistent peripheral-specific management statistics and reports these statistics as well as status of the peripheral device upon request. The peripheral device handler component 61 also notifies interested parties of changes in peripheral device status and recovers peripheral device hardware functionality after a failure. The peripheral device handler component 61 finalizes by releasing any needed system resources and deactivates and unloads subcomponents. In addition to its device management responsibilities, the peripheral device handler 61 also provides application services. For instance, the peripheral device handler component 61 tests the connected hardware device for correct operation, normalizes the service interface so that similar devices share a common interface, and translates application requests into detailed hardware device requests. As will be appreciated to those skilled in the art, the specific nature of the services rendered by the peripheral device handler component 61 depends upon the specific hardware device type.

The peripheral device manager component 62 manages the components that interface with the connected peripheral devices. The peripheral device manger component 62 loads the peripheral device handler component 61 for the connected devices during startup and initializes the peripheral device handler component 61 during startup. The peripheral device manager 62 notifies interested parties of changes in peripheral device availability, finalizes the peripheral device handler component 61 during shut down, and unloads the peripheral device handler component 61 during shut down. In addition to its responsibilities for device management, the peripheral device manager component 62 also provides application services. For instance, the peripheral device manager component 62 coordinates usage of the peripheral devices by customers versus diagnostics and serializes application requests to each peripheral device. The peripheral device manager component 62 also routes each application request to the appropriate peripheral device handler component 61 and reports status of all connected peripheral devices upon request.

The session device manager component 63 is an in-session component that coordinates the control access to control devices via an acquisition mechanism. Upon request, the session device manager component 63 first determines the availability and capability of the acquired device and returns the device reference to the client. The session device manager component 63 queries the peripheral device manager component 62 to determine devices available to the system, queries the delivery capabilities to determine the available remote devices and creates instances of those devices for use by session components and services acquired device requests from the dialog services set 80 for requested type of interface for a specific device. The types of interfaces supported, for instance, include management interface, application interface, and diagnostic interface.

The delivery system 12 is not limited to any particular type of peripheral device. Further the delivery system 12 is not limited to peripheral devices that are associated with any particular type of remote device, such as the CAT/CASST 16, but rather may be associated with any remote device. The peripheral devices include, as examples, a touch screen, screen display, form printer, card reader, PIN encrypter, envelope depository, cash dispenser, speech generator, and sound generator. The peripheral devices also may include an audio generator, video player, proximity detector, and a biometric scanner. As will be apparent to those skilled in the art, the status of a peripheral device and statistics associated with that device will vary with the particular peripheral device. For instance, with a card reader, the status may be up/down and capture bin full. The statistics associated with a card reader may include the number of cards read, the bad reads, cards captured, long time-outs and short time-outs. As another example, the status of a depositor may include up/down, ink low, or bin full and the statistics for the depositor may include the number of envelopes captured.

E. System Services Set 70

The system services set 70 provides common services for all sessions within a server, including logging, event brokering, service registration, and cryptographic services. The system services set 70 includes a process controller component 71, a logger component 72, an event broker component 73, a services registry component 74, a crypto man component 75, an instrumentation component 76, a system management agents component 77, and a test manager component 78.

The process controller component 71 starts up all the non-session system service and peripheral device management processes in the delivery system 12. The components that the process controller starts includes the logger component 72, the event broker component 73, the services registry component 74, the crypto man component 75, the instrumentation component 76, the system management agents component 77, and the test manager component 78. The process controller component 71 further starts up the peripheral device manager component 62 in the peripheral device services set 60 and a session controller component 131 in the session services set 130.

The logger component 72 writes and manages log files and works in conjunction with an NT log facility. The logger component 72, for instance, adds standard headers to log entries and writes the log entries to a log.

The event broker component 73 provides a way for a business to do specialized processing of events for the purpose of monitoring and acting upon activities in a server. Local business provided components can register with the event broker component 73 to receive specified events. The event broker component 73 evaluates filtering rules associated with events and then calls the registered component as a result of a rule succeeding. The event broker component 73, for example, could decide when to send notifications to a system management system.

The services registry component 74 registers the mini-apps and legacy app bridges that are available. The services registry component 74 has a CreateComponent function that, given a well-known name for a service, will look up the full class name and create the component. The services registry component 74 works in the context of the procedures for software distribution and cutover/fallback of releases in order to maintain a registry of the mini-apps and legacy apps that are currently available. The services registry component 74 also provides information to a navigation shell component 82 within dialog services set 80 about the mini-apps and legacy apps that are currently available.

The crypto man component 75 performs cryptographic functions necessary to handle security. The crypto man component 75 manages secret keys associated with external service providers and performs authentication of public key certificates. The crypto man component 75 holds security keys for each external service provider, which may be multi-level keys for each external service provider. Further, the keys may be shared secret or private key associated with a public key. The crypto man component 75 also updates keys and uses keys to generate message MAC and encrypt message. The crypto man component 75 also encrypts and re-encrypts customer PIN/TPIN.

Many components of the delivery system 12 need to update counters or provide some means by which they may be monitored or controlled, especially components that need to support being monitored and controlled by the system management facilities. Several instruments allow interested components to observe changes in other components. Each instrument provides a point of contact or rendezvous between an instrument updater and its interested observers. Whenever an instrument updater changes the instrument value, the interested observers are notified of the change, giving the opportunity to observe the changed instrument value. All instruments are created and maintained by the instrument manager component 76. Both instrument updaters and instrument observers obtain references to instruments from the instrument manager component 76. Each kind of instrument has a publisher that defines the name of the instrument and the value of the various instrument properties. The instrumentation component 76 performs an important function of keeping a record of counters and controlled variables in a persistent store. The supported instruments include, but are not limited to, the counter instrument, bounded counter instrument, status instrument, and control instrument. The instrument component 76 creates and maintains counters, maintains a value, publishes a list of the status values and names, registers and unregisters value observers, and increments or decrements a value. The instrumentation component 76 also notifies registered observers when a value changes and notifies registered observers when a limited counter value crosses a threshold, such as a lower bound or an upper bound threshold.

The system management agents component 77 comprises three agent components: a management protocol agent, a command dispatch agent, and a status management agent. The management protocol agent interfaces with an external system management product on the system 10 and translates a specific system management protocol to or from a format supported by the command dispatch agent and the status monitor agent. The management protocol agent translates an incoming management request into an inquiry or modify for the command dispatcher agent, translates a system management alarm from the status monitoring agent into the remote system management protocol, and supports secure access to the management server. The command dispatch agent translates requests for actions or status into the proper control instrument variables needed to control a component or retrieve its status. The command dispatch agent translates inquiries/modify requests to proper instrumentation component instrumentation objects, such as control variable, counter, and status indicator. The status monitor agent monitors status instrument variables and events, determines if an external system management product needs to be notified, and sends any important "alarms" to the external system management product. The status monitoring agent registers for events from the event broker component 73, registers for changes to instruments, state machine correlates and filters information, uses instruments for some local action or inquiry, and sends a "higher level alarm" to the management protocol agent and/or to an event broker management protocol agent.

The test manager component 78 manages the testing and tracing of components in the system 12. The test manager component 78 collects information from the various components in the system 12 by wiring itself into them during component creation. Then, the components that have been wired for test report method entries and exits to the test manager component 78 during their operation. The configuration of which components are under test or trace can be driven by scripts or by an on-line test management user interface. The test manager component 78 records information reported by the components under test in a log or it can report the test results to the tester through the test management user interface. The test manager component 78 therefore knows which components are under trace and test and wires new components for tracing and testing.

F. Dialog Services Set 80

The dialog services set 80 is responsible for the semantic content and interaction with the customer and for initiating transactions on the customer's behalf. The dialog services set 80 includes a welcome mat component 81, at least one navigation shell component 82, at least one mini-app dialog component 83, and at least one legacy app bridge component 84. Although the navigation shell component 82, the mini-app dialog component 83 and the legacy app bridge component 84 have been shown as single components, each of these components may comprise a plurality of components.

The welcome mat component 81 outputs the initial welcome page to the customer and collects customer identity and preference information. After determining the issuer of the customer ID and possibly authenticating the customer, the welcome mat component 81 instantiates several customer services objects to hold information about the customer and then starts a navigation shell component 82 which carries out the next level of dialog with the customer. The welcome mat component 81 establishes connection sessions with a back door man component 101 in the ESP interface services set 100 as needed by a session. The welcome mat component 81 also acquires devices needed by the session and creates a scam transaction executor to handle unsolicited scam events from a host. The welcome mat component 81 presents an out of service or welcome page, enables a card reader, and waits for card read events. If the card event is an administration card, the welcome mat component 81 instantiates an administrative welcome mat component. The welcome mat component 81 collects various information from the customer including language choice and other preferences, such as navigation style. The welcome mat component 81 also collects customer ID information, such as CIN/PIN and public key certificate, in a manner consistent with the customer remote device and mode of access, such as dial-in or Internet. The welcome mat component 81 handles retries if errors occur on customer identity input, for instance by re-reading a card, and asks customer ID component 111 for issuer. The welcome mat component 81 instantiates a profile transaction executor component 91 to authenticate the customer and get the customer's relationships or customer profile. This process typically involves interactions with the issuer external service provider, but may alternatively be performed locally based on information in a SmartCard. The transaction executor component 91 instantiated by the welcome mat component 81 will instantiate the following customer service components: customer ID component 111, customer relationship component 113, account component 115, and issuer component 112. The welcome mat component 81 will also instantiate a transaction record queue component 91, initialize legacy app bridge components 84, and start a navigation shell component 82 based on delivery capabilities, acquirer rules, and customer preferences.

The welcome mat component 81 may rely on separate micro-app dialog subcomponents to do some parts of the dialog that may be common to several business functions or which may vary depending on the remote device peripherals. For instance, the welcome mat component 81 may rely on a hello screen micro app, a language select micro app, and a get PIN customer data micro app.

The welcome mat component 81 may do four things for customer authentication based on acquirer rules and the type of customer ID, such as public key certificate, ATM card, credit card, on-us, or off-us. The welcome mat component 81 may provide immediate local authentication using public key certificates or may provide immediate authentication with the issuer, waiting for a response. The welcome mat component 81 may also provide background authentication with the issuer while going on to the navigation shell component 82 or may defer authentication to the first transaction. With deferred authentication, the welcome mat component 81 may need to instantiate a default customer relationship component 113 and a default set of product types, such as checking, savings, or credit card. If a rule broker component 121 does not have a registered issuer for the card/CIN prefix number, a customer ID component 111 is instantiated and marked invalid, further authentication of the customer is skipped, and a navigation shell component 82 for invalid customers is started. Invalid customers may still be allowed to use certain information only in mini-app dialogs.

The navigation shell component 82 informs the customer of the range of mini-apps that are available and provides top level navigation across these applications. The navigation shell component 82 assigns a frame space within which a mini-app runs. To support complex grouping of functions or a variety of navigation styles, the navigation shell component 82 may contain shells within shells. The navigation shell components 82 available for selection by a customer include linear, which guides customers through detailed question and answer steps; nonlinear broad branching, such as pull-down menus; preferred, such as customer specified short cuts; or query, which may include a search engine or natural language searching capabilities. The navigation shell component 82 obtains lists of possible services available from services registry component 74, checks rules to see what services are actually available in the current system context, and makes the customer aware of the range of mini-apps available. The range of mini-apps available will be based on the customer's relationship, the issuer/acquirer rules, and the set of dynamically registered mini-apps. The mini-apps may be organized and identified by the navigation shell component 82 with names, icons, or any other type of representation. The navigation shell component 82 instantiates additional navigation shell components 82 as necessary and instantiates mini-app dialog component 83 as requested by the customer. The navigation shell component 82 supports switching between concurrently active mini-app dialogs and, at the end of a session, instantiates and calls end of session mini-app. The delivery system 12 preferably supports the customer leaving a mini-app to enter the navigation shell component 82 and to start another mini-app, while leaving the former mini-app suspended in its current context state. The customer can later exit from the new mini-app and go back to the former mini-app or can switch between multiple concurrently active mini-apps. In an environment where the screen has imbedded frames, a main navigation shell component 82 may, for example, invoke one or more sub shell components 82 to control individual frames.

The mini-app dialog component 83 manages the dialog with a customer for a specific business function in a specific dialog style. The mini-app dialog component 83, for instance, may manage the business functions of transferring funds or bill payment in the styles of question and answer or forms. The mini-app dialog component 83 presents information and choices to the customer and collects and validates customer inputs. The mini-app dialog component 83 is responsible for the content of information on pages and the flow of the customer interaction, but preferably not the style and layout of the presentation. The mini-app dialog component 83 may comprise several different mini-app dialog components 83 with different dialog styles for the same business function. The mini-app dialog components 83 may support different modes of the customer entering information, such as guiding the customer through detailed question and answer steps or forms with multiple input fields. After collecting the necessary customer inputs for a particular business function, the mini-app dialog component 83 uses a transaction executor component 91 to carry out the function by doing transactions with external service providers and operating peripheral devices, such as a cash dispenser or depositor. The mini-app dialog component 83 implements the customer-visible control flow for a particular function in a specific dialog style. The flow may be tailored based on the customer relationship and on various countries/business rules. The mini-app dialog component 83 uses a language man component 122 within the business services set 120 to do translation of phrases into target languages for display or print. The mini-app dialog component 83 assembles phrases and formatted data into pages, for display or print, with each page constructed in a canonical format by setting properties of named objects within named templates. The mini-app dialog component 83 sends pages to the presentation manager component 52 which handles the final style and layout for the specific remote device. The mini-app dialog component 83 collects customer inputs and validates customer inputs using business rules. Validation, for instance, includes basic field validations as well as cross-field validations. The mini-app dialog component 83 instantiates and calls transaction executor components 91 to do transactions with external service providers and also operates remote devices, such as a cash dispenser or a depositor, needed by the business function. The mini-app dialog component 83 queues transaction data for printed record and increments transaction counters in the instrumentation component 76. A mini-app dialog component 83 may, for instance, use separate mini-app dialog subcomponents 83 to do some parts of the dialog that may be common to several business functions, such as PIN entry, account resolution, and entering currency amount.

The legacy app bridge component 84 is a bridge that enables a legacy application set to operate in the delivery system 12. The legacy app bridge component 84 translates data between customer and business services objects in the delivery system 12 in the form that data is stored in the legacy applications. A different legacy app bridge component 84 may exist for each type of legacy application set, such as USCAT, AsiaCAT, LatinCAT, and EuroCAT. On entrance to a legacy application, the legacy app bridge component 84 obtains data from the session services set 130 and customer services set 110 and translates the data into the global data structures needed by the legacy application. On exit from a legacy application, the legacy app bridge component 84 takes modified data from the legacy structures and puts the data back to the customer services set 110 within the delivery system 12. The legacy app bridge component 84 translates legacy pages into the canonical page structures needed by the presentation manager component 52 and interfaces with the back door man component 101 to send messages to external service providers. The legacy app bridge component 84 also interfaces with the logger for logging errors and transactions. During initialization of the legacy app bridge component 84, the rule broker component 121 and various rule authorities, primarily acquirer and issuer, may need to be interrogated to obtain data needed to populate static tables used by the legacy applications for processing rules. Depending upon the extent of migration, the legacy app bridge component 84 may have several different relationships between it and the navigation shell component 82. For instance, the navigation shell component 82 may provide the top level navigation across the new mini-app dialog component 83 as well as the individual legacy app bridge component 84. For some card types and issuers, the navigation shell component 82 may be faceless and all business functionality is provided by the legacy apps. In this alternative, top level navigation may be provided within the legacy applications. For CAT applications, one of a pool of CAT/TAFE runtimes will be assigned to a session at start-up. The legacy applications will be assigned a frame space within which the navigation shell component 82 "plays" its applications. Individual CAT level 3 functions will be individually registered and exposed. The navigation shell component 82 supports exposing CAT level 3 functions without the need to traverse the existing level 2 menu structure.

G. Transaction Services Set 90

The transaction services set 90 handles external service provider transactions needed to accomplish particular business functions. The components within the transaction services set 90 provide transaction coordination and external service provider message formatting. In some cases, more than one transaction executor component 91 may be associated with a given business function. Some examples of typical transaction executor components 91 are profile transaction component, scam transaction component, withdrawal component, deposit component, transfer component, transaction journal component, get payee list component, update payee list component, and make a payment component.

Each transaction executor component 91 performs a particular business function, such as cash withdrawal, by doing transactions with external service providers. The transaction executor component 91 validates properties of data obtained from mini-app dialog components 83 to determine whether the required information needed to do the transaction exists. If the data is missing, the transaction executor component 91 immediately returns an error. The transaction executor component 91 collects additional information needed to do the transaction from other objects, such as customer ID component 111, acquirer component 114, issuer component 112, or account component 115. The transaction executor component 91 formats messages to be sent to external service providers and orchestrates complex transactions by sending messages to multiple service providers, serially or concurrently, as necessary. The transaction executor component 91 also parses response messages and returns information as properties of a transaction object and recovers from external service provider transaction failures. The transaction executor component 91 may also reverse transactions during a recovery. The transaction executor component 91 calls system logger component 72 to record an audit trail of transactions.

H. External Service Provider Interface Set 100

The external service provider interface services set 100 provides protocol support for interfacing with external service providers 22. The external service provider interface services set 100 includes the back door man component 101 and the external service provider interface component 102.

The back door man component 101 multiplexes messages from multiple transaction executor components 91 in several sessions to a single external service provider. The back door man component 101 provides message sequencing over all messages sent to a particular external service provider and also provides response routing back to the requesting transaction executor component 91. The back door man component 101 secures messages exchanged with an external service provider, such as with MAC or encryption. The back door man component 101 generates sequence numbers, adds external service provider envelope to outgoing messages, and sends outgoing messages to the external service provider interface manager. The back door man component 101 is responsible for retry of messages and checks sequencing of incoming messages. The back door man component 101 routes response messages to the proper transaction executor component 91 and routes incoming unsolicited messages to a registered or well-known system component. The back door man component 101 switches between alternate or back-up external service providers to provide error recovery, load sharing, or alternate routing. The back door man component 101 can support multiple outstanding requests simultaneously. During operation, the back door man component 101 knows which of the alternate or back-up external service providers are active, the name/addresses of external service providers, server ID information, message sequence numbers, and message security context.

The external service provider interface manager component 102 provides protocol support for connecting to an external service provider 22. For example, the external service provider interface manager component 102 might provide X.25, 3270, or SNA protocol support. The external service provider interface manager component 102 provides protocol support for a specific type external service provider interface, if needed.

I. Customer Services Set 110

The customer services set 110 provides a category of services that includes all information specific to the customer who initiates a session. All information related to identifying the customer, the issuing business of the customer, the customer's profile, and all the customer's accounts are the component objects included within this category of services. The customer services set 110 includes a customer ID component 111, an issuer component 112, a customer relationship component 113, an acquirer component 114, and an account component 115.

The customer ID component 111 contains information and answers questions about a customer's identity and associated information. The customer ID component 111 supports query of customer ID and card information, supports update of customer ID and card information, and identifies card issuer. The customer ID component 111 knows the customer primary ID including the CIN, encrypted PIN/TPIN, and public key certificate. The customer ID component 111 also knows the status and profile action code indicating ID validity: valid, invalid, or unknown. The customer ID component 111 has card information, if a card was used, including the type of card, such as ATM, credit card, SmartCard, and tracks present and track data. The customer ID component 111 knows the tier of service a card supports, the advisory message text to be displayed, the primary relationship type code, and the deposit only flag. The customer ID component 111 has links to account list, an issuer list, and a customer relationship list. The customer ID component 111 may also store the name of a customer, mail address of customer, E-mail address of customer, and phone numbers of the customer and provide this information to the customer or external service provider 22 so that this information does not have to be requested more than once.

The issuer component 112 represents the issuing business for the customer-ID information that was used to start a session. The issuer component 112 is the rule authority for all general, issuer related, non mini-app specific business rules. The issuer component 112 supports query of issuer information and supports answering questions about general issuer business rules. The issuer component 112 has information about the issuer of customer's identity, for instance, business code, financial institution identifier, and issuer type, such as bank card, credit card, or other third party card. The issuer component 112 knows the PIN length supported and the issuer country and ISO currency code for the issuer default currency. The issuer component 112 has a list of customer relationships for the issuer and a list of accounts for the issuer. The issuer component 112 also knows the products and services supported and the transaction and product limits. The issuer component 112 is informed of the issuer's presentation rules, such as data, format, and account number masking, and the issuer's local rules, such as collect call support, currency, and product names. The issuer component 112 also knows the issuer's servicer-ESP communication rules, for instance, profile message support, the languages supported, and the navigation schemes supported. The issuer component 112 knows when or how to authenticate customer, such as by local validation of public key certificate, immediate to issuer, background to issuer, or delayed to first transaction.

The customer relationship component 113 contains information and can answer questions about a customer's relationship. The information contained within the customer relationship component 113 includes the accounts and products owned by the customer, customer type, preferences and privileges. The customer relationship component 113 supports query of customer relationship information and supports update of customer relationship information. The customer relationship component 113 knows the owner of the customer relationship or issuer, the customer relationship ID, the customer relationship type, such as Citibank account or CitiGold, and the customer relationship nickname. The customer relationship component 113 has a list of accounts/products associated with a customer, a list of account categories, and a list of accounts for the customer. The customer relationship component 113 also knows the customer's predefined transactions and has an account summary status. The customer relationship component 113 has the list of payees and the payee list status. The customer relationship component 113 knows the customer privileges or limitations, such as the number of quotes allowed for that customer. Some businesses, such as those in Mexico, Venezuela, or Brazil, can have multiple relationships per card. In the top level navigation, the customer may select one of them as the primary relationship to use for a session. The transfer application, however, can transfer between accounts in different relationships.

The acquirer component 114 contains information and answers about the acquirer. The acquirer component 114 represents the acquiring business for a session and is the rule authority for business rules that are acquirer related, but not mini-app specific. For rules that are acquirer related and mini-app specific, separate rule authorities may be registered as part as a dynamic installation of a mini-application. The acquirer component 114 supports query of acquirer information and processes certain specific rules associated with the acquirer. The acquirer component 114 knows information about acquiring business for a session, for instance a financial institution identifier and business code, and knows the country or region of acquirer.

The account component 115 contains information and can answer questions about a particular account. Each individual account preferably has only one account component 115 with the account details and rules varying for the particular individual account. The account component 115 supports query of account information and supports update of account information. The account component 115 knows the business owning the account, the category of the account, and the product type and subproduct type of the account. The account component 115 also knows the fund family code and fund code, the category code, the account name, account number, and account details, such as currency code, balances, and terms. The account component 115 has information on the functional privileges and limitations and also information on associated link accounts. The individual accounts may be customer owned or payee accounts that can be the target of a transfer or bill payment.

J. Business Services Set 120

The business services set 120 provides formal mechanisms for dealing with business rules, language support, and acquirer services. The business services set 120 includes a rule broker component 121 and a language man component 122.

The rule broker component 121 formalizes a mechanism for dealing with business rules that have conventionally been ad hoc. The rule broker component 121 is a central registry for all business questions. Other components within a session address named business questions to the rule broker component 121. The rule broker component 121 routes the question to the rule authority or authorities that have registered for a rule. By having a separable rule authority for each mini-app specific business rule, new rules can be added independently without affecting the rest of the delivery system 12. The rule broker component 121 supports the concept of overrides, which allow the dynamic registration of a new rule authority when changes to business rules are necessary. The rule broker component 121 may either answer questions directly or route questions to another component, such as an account component 115 or the issuer component 112. The rule broker component 121 is also responsible for interfacing into rules databases and knows what component will answer each question.

The language man component 122 provides the application with a facility to resolve the necessary text phrase needed in a particular context. The context includes the language selected by the customer and the type of device in use. The language man component 122 provides a repository of phrases which allows an application to be written in a language and device independent way. From the application point of view, all phrases are named. When an application needs to display a phrase, the application queries the language man component 122 for the correct text for this phrase name given a specified language choice and the current presentation device type, which has been provided by the presentation manager component 52. The language man component 122 can also extend this capability to the use of phrases with imbedded variables. Thus, the application may supply additional parameters to be inserted into the phrase at a required point. To resolve a request, the language man component 122 uses a phrase repository to look up the correct version of a particular phrase, with the repository being segmented. A set of "global" phrases are usable by all applications and a mini-app dialog specific set of phrases is established. Thus, given the ID of a requesting mini-app dialog component 83, the repository specific to that mini-app dialog component 83 is searched first and then, if the phrase is not found, a global repository is searched. The phrase repository allows a degree of independence in the creation of mini-app dialog components 83. No coordinated update to the global repository is needed to release a new mini-app dialog component 83 and a mini-app dialog 83 can override the global phrase. The language man component 122 also provides APIs for the dynamic construction of phrases needed to deal with gender and plural issues encountered in some languages. The language man component 122 looks up a requested phrase in a phrase repository and returns the phrase based on the client ID, language ID, locale, phrase medium, phrase formulate, and device type and may be qualified by the device, as well, such as short form of the phrase for a small display on the device. The language man component 122 is backed by a set of development tools to create and maintain phrase repositories. These development tools provide for creation and deletion of phrase IDs, mechanisms to add, change, and delete phrase text in the repository, multi-lingual text entry, and specification of variable insertion points as well as graphic files or sound or video files.

K. Session Services Set 130

The session services set 130 includes a session controller component 131, a session component 132, and a delivery capabilities component 133. The session controller component 131 manages all the sessions in the delivery system 12. When a new customer contacts the delivery system 12, the session controller component 131 starts a session by instantiating a session bubble for the session. The session bubble, for instance session bubble S shown in FIG. 2, bounds a secure set of resources allocated to one and only one customer session. The session controller component 131 is aware of the type of customer remote device a start session request came from and the broad product type of service requested so that the appropriate type of session bubble can be instantiated. The session controller component 131 creates a session when a customer contacts the delivery system 12 by instantiating a new instance of the session object. The session controller component 131 maintains a registry of all active sessions with handles to the session objects. The session controller component 131 also terminates a session when a customer abnormally breaks the connection.

The session component 132 manages the resources associated with this session. The session component 132 brings up some initial session resources and is the registry for the brought up session components. The session component 132 also knows certain session context information as well as all assigned session resources and services. The session component 132 instantiates and initializes the following resources when a session is created and deletes them when the session is terminated: delivery capabilities component 133, rule broker component 121, front door man component 51, presentation manager component 52, acquirer component 114, language man component 122, and welcome mat component 81. The session component 132 sends touch point attached notification to each of the components and supports registration of additional session components that need to be accessed globally by the session. The session component 132 recovers resources when a session abnormally terminates and logs significant session events, such as start or end of session and session errors. The session component 132 has session initiation information including the session ID and the start of session time. The session component 132 also has the handles for linking to many other session components and knows which navigation shell components 82 and mini-app dialog components 83 are active. The session component 132 also knows the reason for the end of a session.

The delivery capabilities component 133 holds data and answers questions about the delivery capabilities of a remote device for a particular session. The information contained within the delivery capabilities component 133 is communicated either explicitly or implicitly in the start up message from the remote device causing the initiation of a session. The delivery capabilities component 133 is available for interrogation from other components within the delivery system 12. The delivery capabilities component 133 answers questions about the delivery capabilities of a remote device. For instance, for a web browser remote device, the delivery capabilities would include the HTML level, less preferably, FTP, picture formats, applet types, script types, and international fonts. The delivery capabilities component 133 is instantiated by the session controller component 131 with the initial capabilities based on access mode, for example, Internet, dial-in, or CAT.

II. Walk-Through Examples

A. Start of Banking Session

An example session will now be described with reference to FIGS. 3A to 3C and FIGS. 4A to 4C. At a step E1, a customer initiates a session. The customer may initiate a session in various ways depending upon the remote device used to communicate with the delivery system 12. For instance, the customer may use a screen phone 14, a CAT/CASST 16, a personal computer 18, or a PDA 20. The customer may also use a remote device 24 and an external service provider 22 to communicate with the delivery system 12. The customer, regardless of the particular remote device used, initiates the session through the touch point and display component 31 of the delivery system 12. At a step E2, a start banking message is sent from the touch point and display component 31 to the touch point interface component 41. At step E3, the touch point interface component 41 sends the start session message to the session controller component 131. At step E4, the session controller instantiates session component 132. At step E5, the session component 132 then instantiates the delivery capabilities component 133 and the session device manager component 63.

At step E6, the session component 132 instantiates the front door man component 51. The session component 132 instantiates the presentation manager component 52 at step E6 and instantiates the presentation manager component 52 at step E7. At step E8, the session component 132 instantiates the rule broker component 121 and at step E9 instantiates the language man component 122. At step E10, the session component 132 instantiates the acquirer component 114 and at step E11 instantiates the welcome mat component 81.

At step E12, the welcome mat component 81 sends a logon to presentation manager component 52. The presentation manager component 52, at step E13, formats the screen based on device specific template and sends formatted information to the front door man component 51. At step E14, the front door man component 51 assigns a session cookie and sends a response via the touch point interface component 41 to the customer.

As reflected in steps E1 through E14, a customer can access the delivery system 12 with any type of remote device. In response, the delivery system 12 will create a session bubble specific for that customer. This session bubble will preferably have a session component 132, a delivery capabilities component 133, a session device manager component 63, a rule broker component 121, a welcome mat component 81, a front door man component 51, as well as various other components dedicated for that particular session. Through the presentation manager component 52, front door man component 51, touch point interface component 41 and touch point and display component 31, the delivery system 12 can format messages to any type of remote device and can custom tailor this message according to the desires of a particular customer. The delivery system 12 is also capable of providing uniformity across the various remote devices so that the customer is presented with a consistent and familiar interface regardless of the remote device used.

B. Customer Authentication

An example of the process of authenticating a customer will now be described with reference to FIGS. 5A to 5D and FIGS. 6A to 6C. At step E21, a customer enters his or her CIN and PIN at the touch point and display component 31 which forwards the information to the touch point interface component 41. At step E22, the touch point interface component 41 forwards the message to the appropriate session bubble based on the session ID in the session cookie. At step E3, the front door man component 51 performs a security check on the cookie and other parameters before forwarding the message to the presentation manager component 52. At step E24, the presentation manager component 52 routes the input to the dialog services set 80. For instance, the presentation manager component 52 may route the input based on mime type and URL to the appropriate dialog welcome mat component 81.

At step E25, the welcome mat component 81 asks the rule broker component 121 who is the issuer based on the CIN. The welcome mat component 81, in turn, instantiates the customer ID component 111 at step E26 and instantiates the issuer component 112 at step E27. At step E28, the welcome mat component 81 instantiates the profile transaction executor component 91 for authenticating the customer and then passes the CIN and encrypted PIN to the transaction executor component 91. At step E29, the transaction executor component 91 formats a reply message and sends the message to the host through the back door man component 101. At step E30, the back door man component 101 adds a universal message sequence and, at step E31, the external service provider interface component 102 provides protocol gateway to the external service provider 22.

At step E32, a response is returned to the back door man component 101 and the back door man component 101 routes the response to the appropriate transaction executor component 91. At step E33, the transaction executor component 91 extracts information from the external service provider message and gives this information to the welcome mat component 81. At step E34, the transaction executor component 91 instantiates the customer relationship component 113 which, in turn, instantiates the account components 115 at step E35. At step E36, the welcome mat component 91 instantiates the navigation shell component 82 which sends initial navigation choices to the customer at step E37. At step E38, the presentation manager component 52 formats style of screen display and sends a response to the customer via the front door man component 51, touch point interface component 41, and touch point and display unit 31.

C. Selection of Mini-App

The selection of a mini-app will now be described with reference to FIGS. 7A and 7B and FIGS. 8A and 8B. At step E41, the customer selects a mini-app with the touch point and display component 31 and the request is sent into the delivery system 12. At step E42, the presentation manager component 52 demultiplexes the request based on mime-type and URL and sends the request to the navigation shell component 82. A step E43, the navigation shell component 82 instantiates the appropriate mini-app dialog component 83. At step E44, the mini-app dialog component 83 returns choices to the customer. At step E45, a back and forth dialog occurs between the customer and the mini-app dialog component 83 until all information is collected for a function. During this step, the mini-app dialog component 83 directs business rule questions to the rule broker component 121 for resolution during the dialog.

At step E46, after all information has been collected, the mini-app dialog component 83 instantiates the transaction executor component 91 for the selected function. At step E47, the transaction executor component 91 formats a message to the external service provider 22 and does the transaction with the external service provider 22. At step E48, the transaction executor component 91 extracts information from the host message and passes the information to the mini-app dialog component 83. As step E49, the mini-app dialog component 83 formulates content of response and sends the response to the presentation manager component 52 for formatting. At step E50, the presentation manager component 52 formats style and layout of response and sends the response to the customer via the front door man component 51, touch point interface component 41, and touch point and display component 31.

III. Rendering Model

To allow for both local delivery to the CAT 16 and to other remote devices, the basic rendering model is indirect. Preferably, none of the components within the dialog services set 80 draw directly to the screen but rather produce a stream of data, the app stream, that will ultimately be rendered by the touch point and display components 31. The app stream is preferably an HTML encoded stream of named objects or tokens with a named template or forms. The dialog services set 80 may then set the properties of these named objects within named templates. Although the dialog services set 80 may set any property of a named object, the delivery system 12 preferably separates content from style so that a specific mini-app can be leveraged and delivered across many delivery vehicles. In general, the mini-app dialog component 83 will operate by setting the values of named properties of named objects and named templates, such as TemplateX.ObjectY.PropertyZ=Value.

The presentation manager component 52, using delivery vehicles specific named templates, is responsible for style and mapping to the encoding language of the target device. The presentation manager component 52 takes the app stream received from the mini-app dialog component 83 and, based on delivery vehicle specific templates, merges the data based on mapping rules and produces the final token stream that is sent to the touch point and display component 31. A one to one mapping exists between canonical templates that mini-app dialog components 83 reference and delivery vehicle specific templates that the presentation manager component 52 uses. Delivery vehicle specific templates include specific information on the layout, colors, and mapping of individual objects. A set of emerging standards from Microsoft and WC3 on advance style sheets, including style sheets that allow precise X,Y positioning of objects may be used as part of the templating mechanism.

Separation of content from style provides many benefits. For instance, separation allows the style and layout of a presentation to be defined and changed independent of the code in the mini-app dialog components 83. Also, separation allows a single mini-app dialog component 83 to deliver its functions to more than one target delivery vehicle through the abstraction of individual objects or tokens. The delivery system 12 allows and encourages the use of abstract objects in the app stream. For instance, the use of an abstract object like "choice" instead of a specific object like "button" allows the choice to manifest itself in many ways on the target delivery vehicle. A choice could manifest itself in one case as a CAT button, in another as a Windows style button, as an HTML anchor, or as an item in a scrolling list.

The delivery system 12 preferably supports ActiveX visual controls within delivery vehicle specific templates. The delivery system 12, however, is preferably expanded so as to map controls to alternative objects for presentation on delivery vehicles that do not support ActiveX controls. The delivery system 12 also encourages the grouping of logically related named objects into named groups. The grouping facilities allow the masking out of a group so that it will not be delivered to certain delivery vehicles based on the capabilities of that device or screen real estate.

The delivery vehicle specific templates define layout and style both for frame sets and within a frame. A frame is a well-known concept within Web browsers and is a rectangular portion of screen real estate, which may be bordered or borderless. A frame set defines the layout of frames within an overall screen window. The frame set defines the width and height of each frame and an initial link to the HTML page or program that will provide the content for that frame. The presentation manager component 52 manages the overall display. Based on templates, the presentation manager component 52 assigns a frame or frames to a navigation shell component 82. In turn, based on templates, the navigation shell component 82 assigns a frame to a mini-app dialog component 83. Within a frame, the layout of that frame is controlled by a delivery vehicle specific template. By assigning frames that bound the display space of specific mini-app dialog components 83, an independence between one mini-app dialog component 83 and another can be maintained and different navigation shell components 82 may be installed independently of the mini-app dialog component 83. The presentation manager component 52 will model the display space as a set of frames and, based on the delivery vehicle specific templates for non-framed devices, the presentation manager component 52 will merge information from many frames into a single frame for delivery to a remote device.

The canonical templates that mini-app dialog components 83 use are bounded by a frame. The mini-app dialog components 83 are responsible for setting the properties of the named objects within its canonical templates. One of these properties that the mini-app dialog component 83 is responsible for setting for "choice" objects is a link. A link is a standard universal resource locator (URL) that specifies the target object, such as the mini-app dialog component 83, and a list of parameters that will be returned if this choice is selected by the customer. The activation of links by the customer is one of the main ways of making choices and navigating through a mini-app dialog component 83. In addition to links, data entered by the customer in input fields, select lists, check boxes, radio buttons, as well as in other ways will be returned to the mini-app dialog component 83 in the app stream in the standard HTML encoding style of name-value pairs. The basic app stream interface can be produced with any programming language. For instance, any programming language that can produce a text stream can also produce an app stream. The programming language preferably should be able to communicate via COM but otherwise has no restrictions. The app stream is a multi-channeled stream capable of supporting the basic text based app stream as well as other mime types.

Although the delivery system 12 encourages leveraging one mini-app dialog component 83 over a large range of delivery vehicles, the delivery system 12 does not preclude writing mini-app dialog components 83 targeted towards a specific delivery vehicle or class of delivery vehicles. The mechanism of passing the app stream between mini-app dialog components 83 and the presentation manager component 52 would remain the same. The mini-app dialog component 83 is still responsible for content and the presentation manager component 52 for style and layout. In this case, however, the range of visual object types or capabilities may only be available on a specific delivery vehicle and might not lend itself to abstraction. For example, the inclusion of client-side scripting may only be available on certain devices or class of devices and may not be easily abstracted.

The delivery system 12 can easily support multi-media. HTML has well-known means for embedding and referencing a wide range of media types, for instance graphics, sounds, and movies. The delivery system 12 preferably uses standard HTML encoding techniques to incorporate this ever expanding set of media types into the delivery system 12 for use by remote devices. To support various error conditions and easy switching and restarting of mini-app dialog components 83, the presentation manager component 52 preferable caches the last page output for each frame that it manages.

IV. Mini-App Packaging

A fundamental advantage of the delivery system 12 is the independence of one mini-app dialog component 83 from another. The delivery system 12 provides a safe environment for the dynamic insertion and registration of new mini-apps with their navigation shell components 82. The delivery system 12 can introduce a new mini-app dialog component 83 so as to require a complete testing cycle only on the introduced application and not a regression test of the entire delivery system 12. The mini-app dialog components 83 are therefore preferably packaged as separate entities. For instance, a mini-app dialog component 83 may include an executable (.EXE) for the mini-app dialog component 83 including the transaction executor component 91 as a DLL or OLE object. The mini-app dialog component 83 also includes a rule file, including all new rule entries to be registered with the rule broker component 121. Also, when appropriate, the mini-app dialog component 83 includes a rules engine file per rule for any rules that can be interpreted by the general purpose rules engine and a rule database file per rule that supplies any needed data to support mini-app specific rule authorities. The mini-app dialog component 83 also includes a language file including all mini-app specific language phrases needed and, when appropriate, a template file containing all mini-app specific templates.

V. NetCAT

Figure 9:
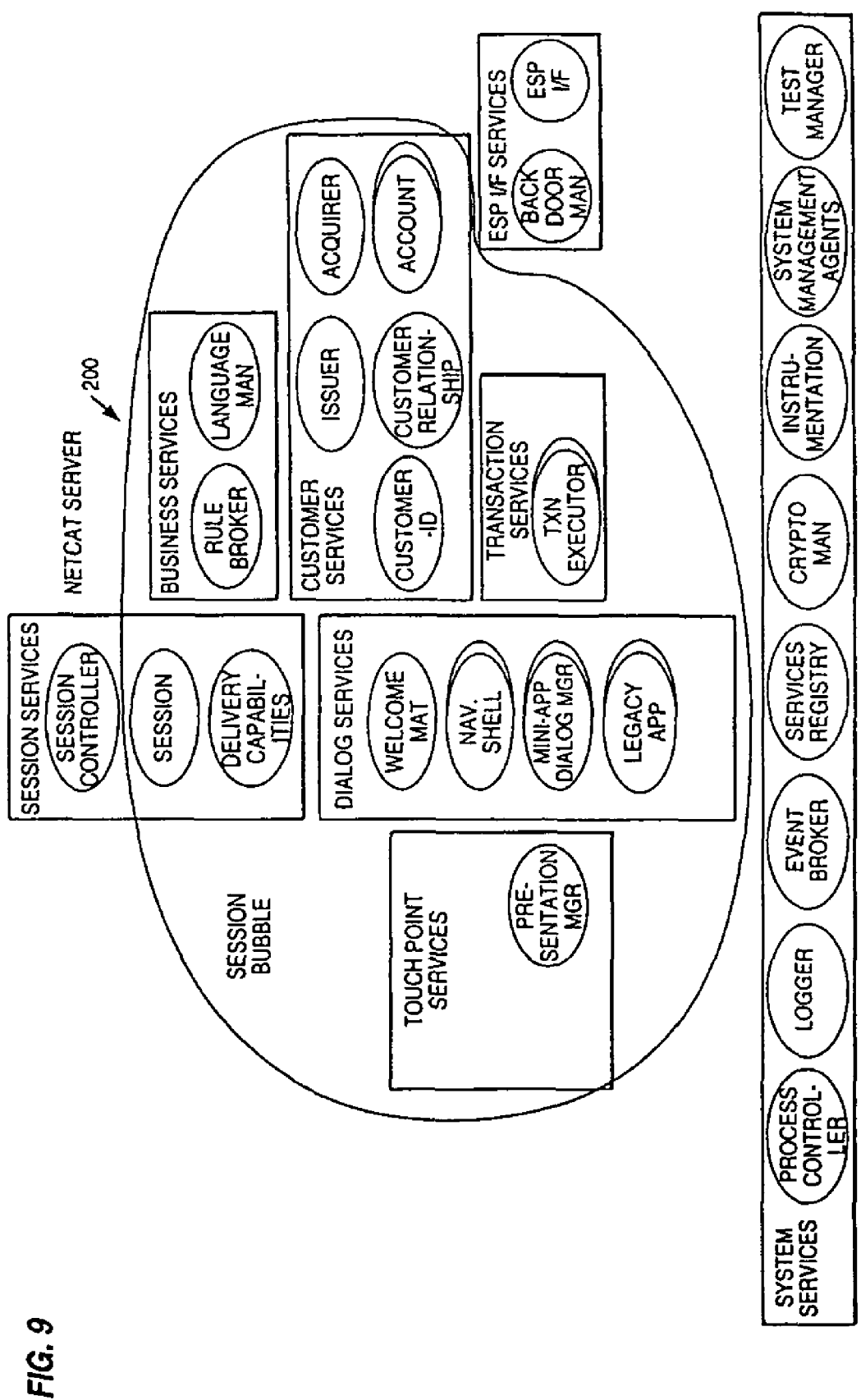
FIG. 9 is a block diagram of a NetCAT delivery system according to a preferred embodiment of the invention for use in providing CAT software to foreign CATs.

An example of a NetCAT server 200 is shown in FIG. 9. The NetCAT server 200 has the ability to present a traveling customer their "home screens." This ability is accomplished without the need to load CAT software for all regions on all CATS 16 around the world. The basic notion is to have at least one NetCAT server 200 for every region. On this NetCAT server 200, a region's CAT software will run and it will be capable of being "remotely projected" through any acquiring CAT 16 around the world, thus providing almost all of the customers home screens around the world. Differences from the customer's home screen will show up on the initial welcome screen, until the customer's issuer is identified, and during certain transactions, notably cash withdrawal, where foreign exchange rates will have to be displayed and regulatory requirements of the acquiring country will have to be honored.

Figure 10:
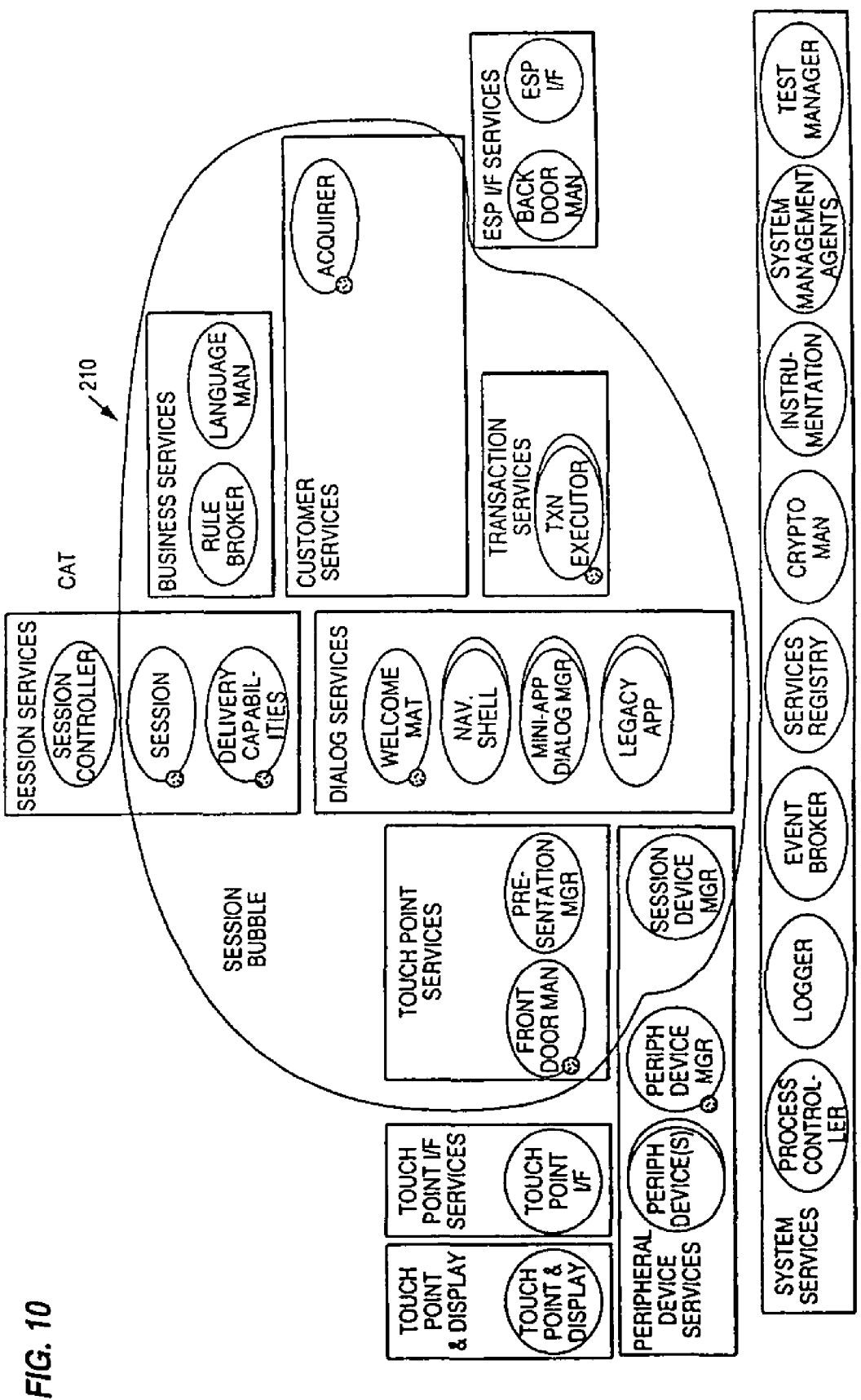
FIG. 10 is a block diagram of a CAT delivery system according to a preferred embodiment of the invention.

To start a NetCAT session, the traveling customer dips his or her card at "foreign" CAT 16 and a session bubble starts up normally at the CAT 16. When the welcome mat component 81 determines that this customer is off-region, the welcome mat component 81 makes a connection to the appropriate regional NetCAT server 200. The welcome mat component 81 on the CAT 16 communicates with the session controller component 131 on the NetCAT server 200 to start up a session. The welcome mat component 81 on the NetCAT server 200, after given card parameters upon start up, instantiates the customer ID component 111 and issuer components 112 on the NetCAT server 200. After NetCAT server 200 authenticates the customer, with its own external service provider, the NetCAT server 200 starts up a navigation shell component 82 on the NetCAT server 200. The CAT 16 exposes/copies certain of its components to the NetCAT server 200 for its use. The CAT 16, for instance, exposes the session component 132, the acquirer component 114, the delivery capabilities component 133, the front door man component 51, the peripheral device manager component 62, the transaction executor components 91, and the welcome mat component 81. The NetCAT server 200 uses these components for business rule inquiries, for delivery to CAT screen, for operation of the CAT peripherals, and for inquiry about the capabilities of the hosting CAT, such as fonts supported and pictographic printing. An example of a CAT 16 is shown in FIG. 10 with the exposed components marked with a black dot.

VI. Global CAT 300

Figure 12:
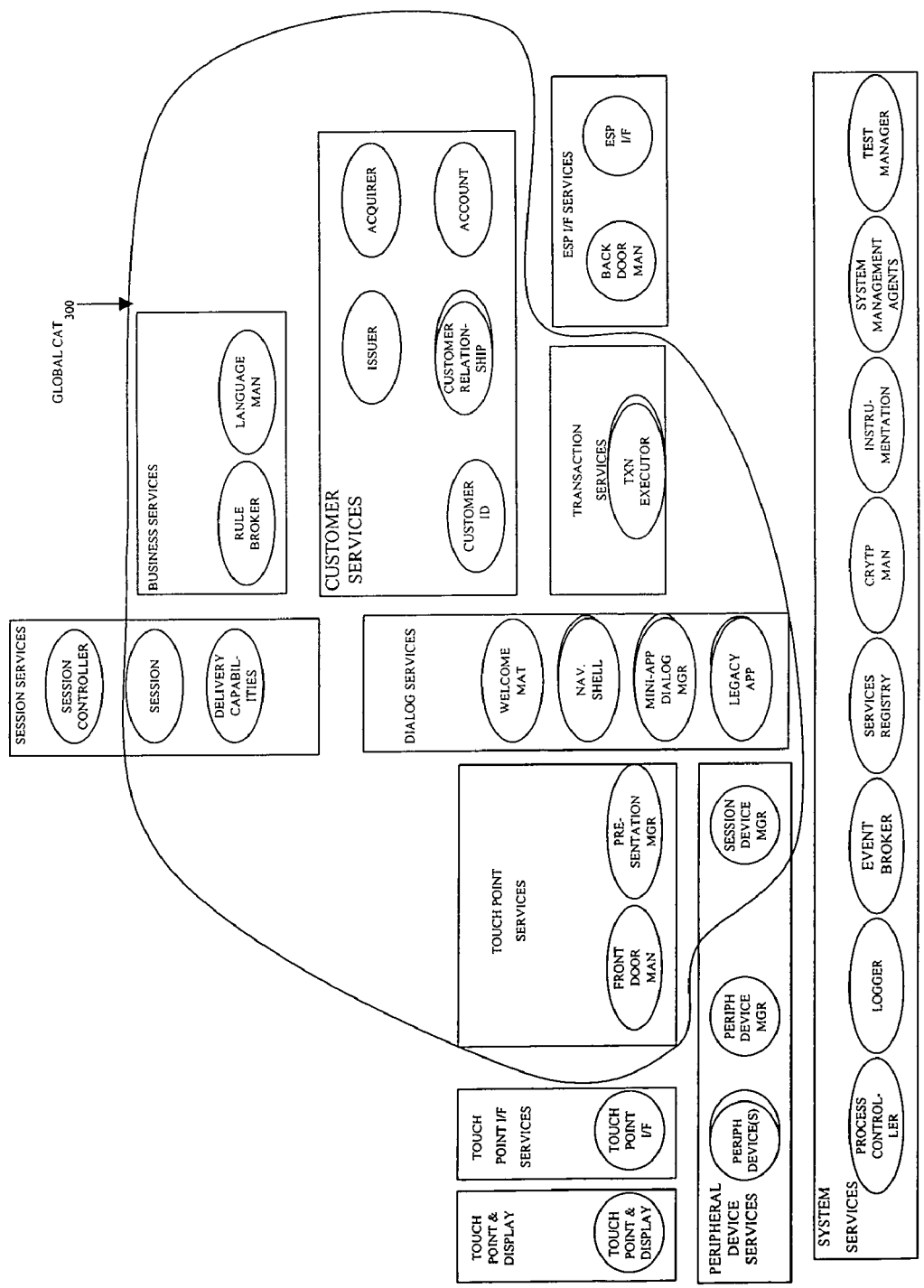
FIG. 12 is a block diagram of a Global CAT delivery system according to another embodiment of the invention for use in providing worldwide CAT software.
Figure 15B:
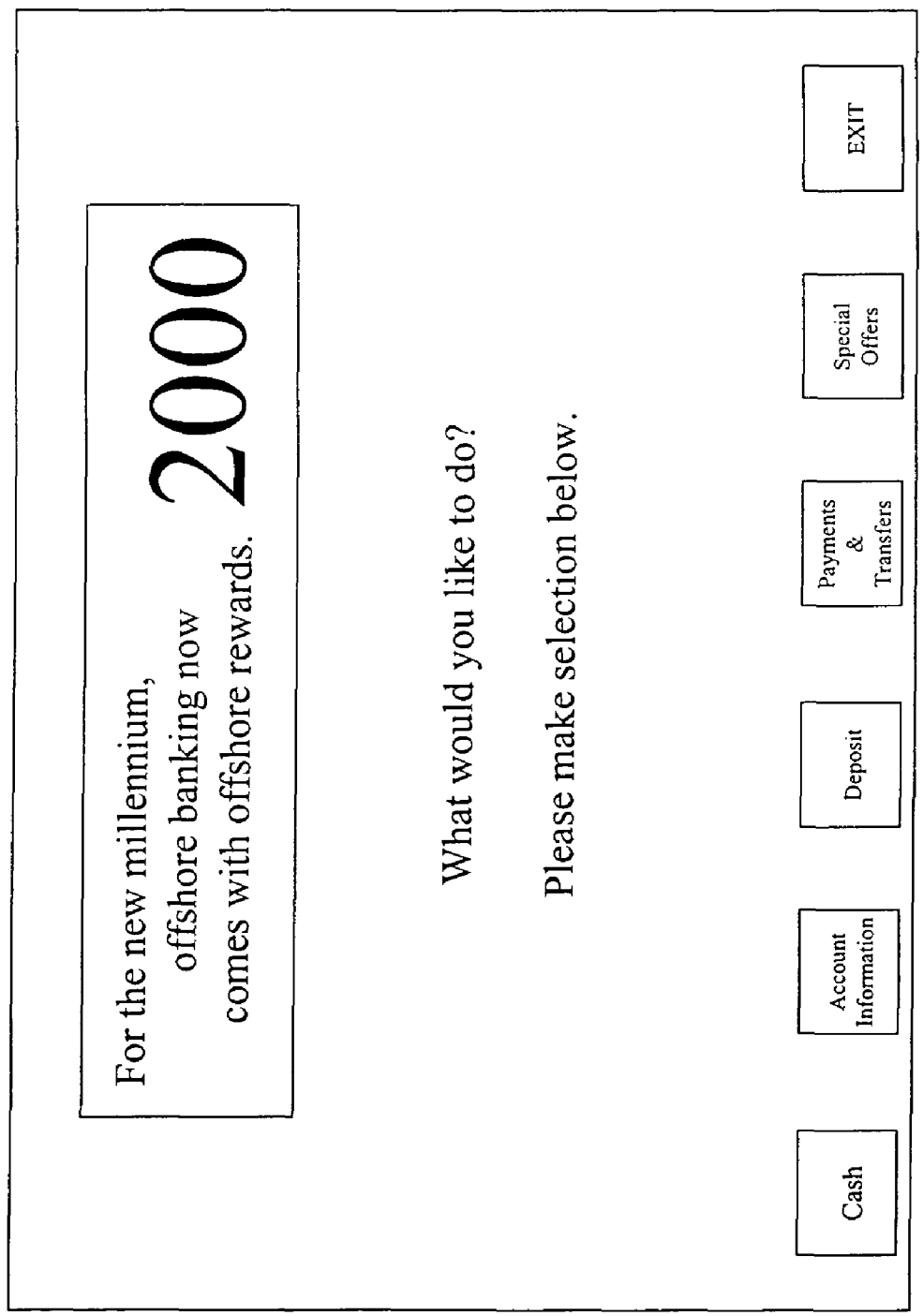
Figure 15C:
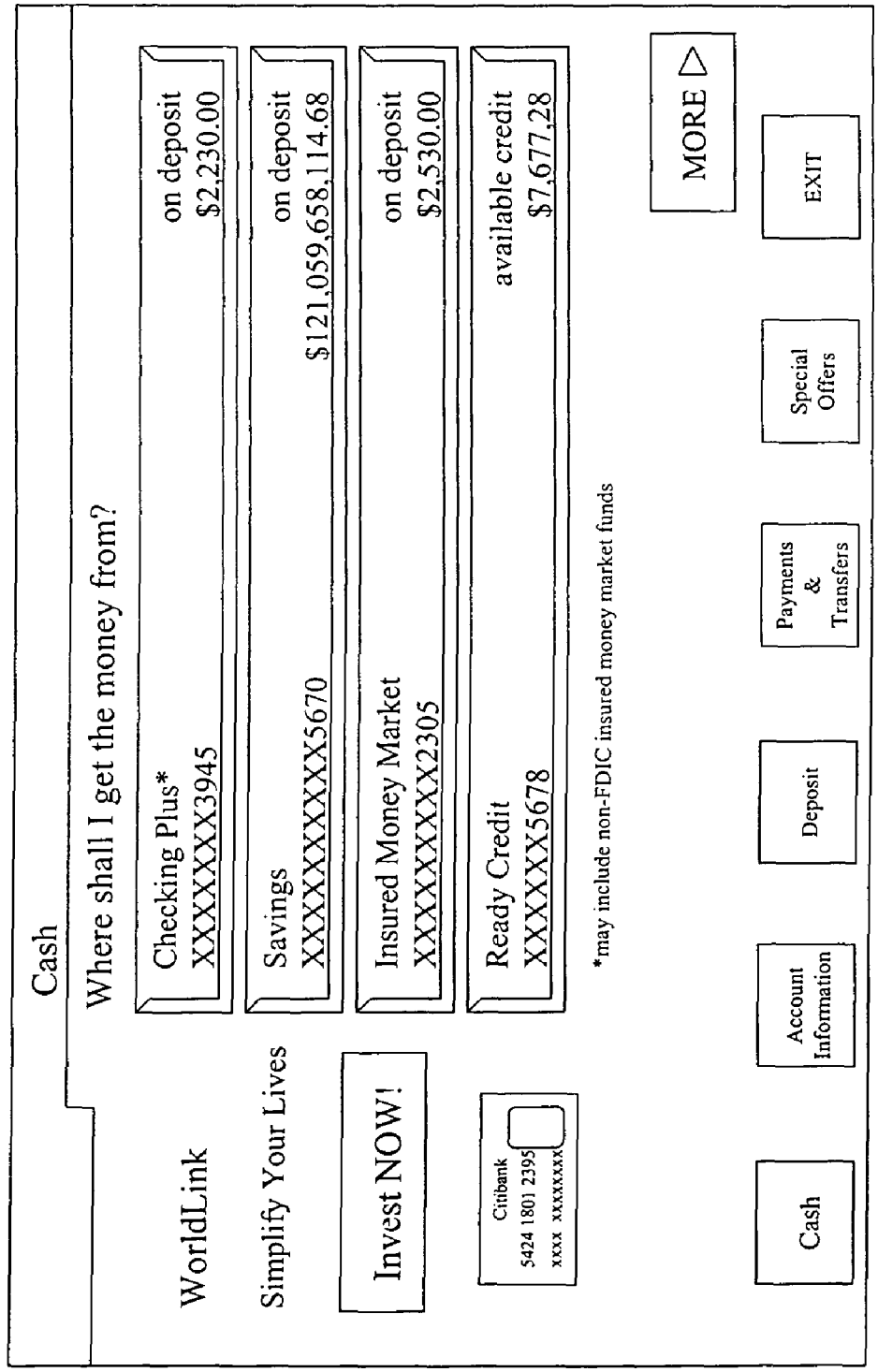
Figure 15D:
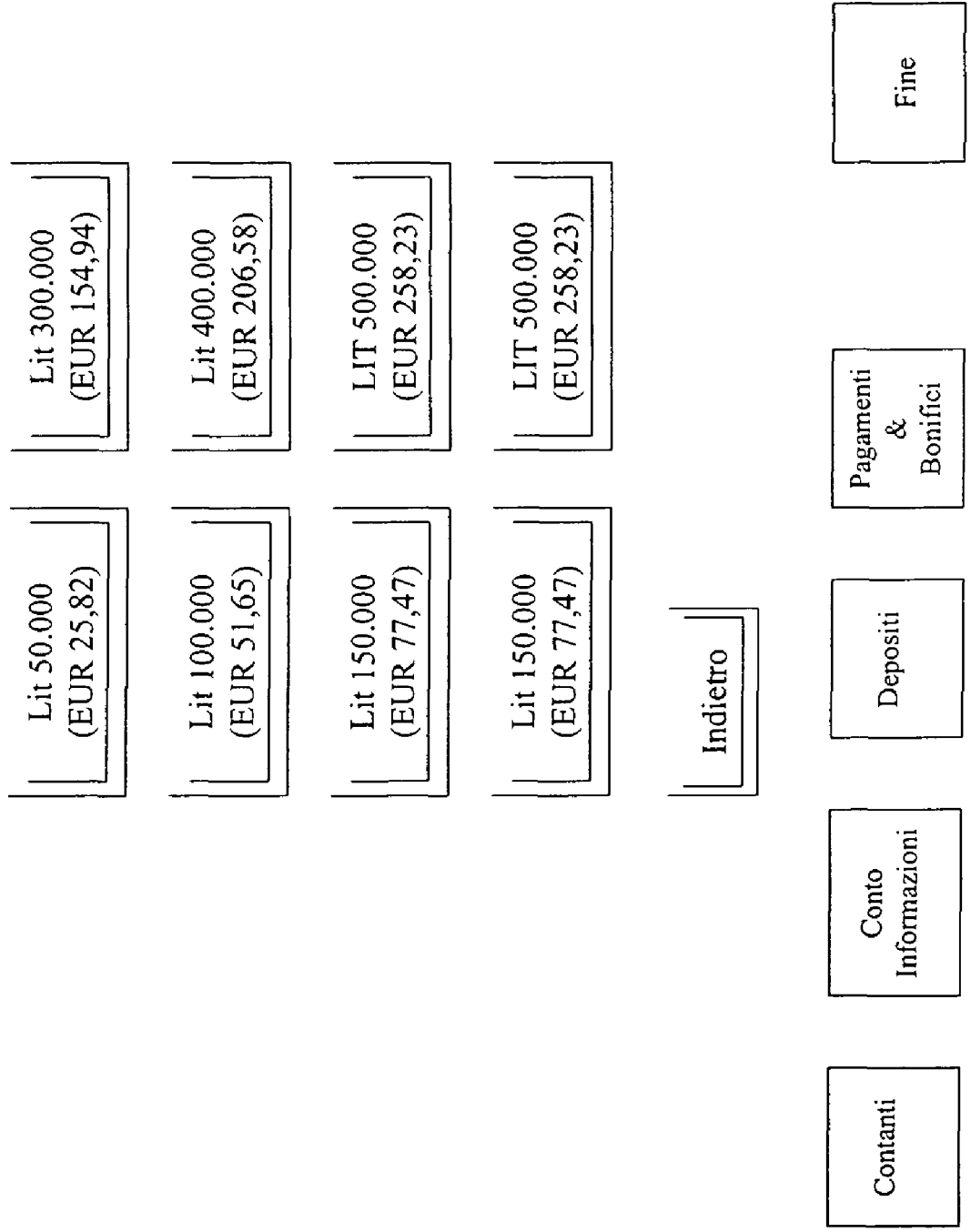

An example of another application, Global CAT 300, that uses the delivery system 12 to configure and deliver globally consistent user interfaces, functionality, and products is shown in FIG. 12. Unlike NetCAT 200, all components of Global CAT 300 reside on the CAT 16. Global CAT 300 uses the language man component 122 and the rule broker component 121 to configure itself.

To start a Global CAT session, a customer dips his or her card at a CAT 16 and a session bubble starts up normally at the CAT/CASST 16. The welcome mat component 81 communicates with the session controller 131 to start up a session. The welcome mat component 81 after given card parameters upon startup, instantiates the customer ID component 111 and issuer components 112. After the customer is authenticated with the external service provider, the navigation shell component 82 is started. The customer selects one of the mini-apps defined for Global CAT with the touch point and display component 31 and the request is sent to the delivery system 21. The navigation shell component 82 instantiates the appropriate mini-app dialog component 83. The mini-app dialog component 83 collects all information necessary for the function. During this step the mini-app dialog component 83 directs Global CAT-defined business rule questions to the rule broker component 121 for resolution during the dialog. FIG. 13 is a table of exemplary Global CAT-defined business rules for an inquiry into account details in an embodiment of the present invention. FIGS. 14A-C are tables of exemplary Global CAT-defined business rules for a withdrawal in an embodiment of the present invention.

After all information has been collected, the mini-app dialog component 83 instantiates the transaction executor component 91 for the selected function. The transaction executor component 91 formats a message to the external service provider 22 and does the transaction with the external service provider 22. The transaction executor component 91 extracts information from the host message and passes the information to the mini-app dialog component 83. The mini-app dialog component 83 formulates content of response and sends response to the presentation manager component 52 for formatting. The mini-app dialog component 83 uses the peripheral device manager component 62 for operation of the CAT peripherals. The presentation manager component 52 formats style and layout of response and sends the response to the customer using the front door man component 51, the touch point interface component 41, and the touch point and display component 31. Sample Global CAT screens are shown in FIGS. 15A-D.

In a typical transaction, such as a withdrawal transaction, a customer dips the customer's transaction card at the CAT 16. Based on the customer's transaction card, such as the prefix of the card, it is determined what type the customer is, such as whether the customer is an "on-us" customer or an "off-us" customer. Based on the customer's transaction card, a set of languages is offered to the customer. If the customer is an international customer, for example, the customer may be offered all eleven ICC languages. If the customer is a local customer, for example, in Italy, the customer may be offered just two languages, namely Italian and English. The customer then selects a choice from one of these languages. At this point, all of the phrases are selected based on that language code corresponding to the language the customer has selected.

Global CAT 300 then goes on to the standard transaction selections. For example, the customer is asked to enter the customer's personal identification number (PIN). The application then goes on to the main menu, which is similar, for example, to a home banking menu. A set of channels is provided, and the channels that are displayed, for example, at the bottom of the user interface are configured based on the customer's transaction card. For example, if the customer is an "off-us" customer, the customer is offered only standard withdrawal and transfer information. However, if the customer is an "on-us" customer, the customer is offered the full range of applications that can be offered to an "on-us" customer of the financial institution.

According to the self-configuring concept of Global CAT, for example, an "on-us" customer can be offered the withdrawal information, deposits, payments and transfers, investments, PIN change, and a whole array of functionality. With regard to this functionality, each business can turn the business rules "off" and "on." Using these business rules, each business can turn the functionality "off" and "on" that is offered to their "on-us" customers. At this point, for example, the "on-us" customer makes a choice, such as a choice to withdraw cash, by choosing the channel that indicates withdrawal of cash.

When the "on-us" customer dipped the customer's card, a message was sent to go get all of the customer's account information. Thus, when the customer enters a choice to withdraw cash, a menu comes up on the Global CAT screen which is different from the standard CAT screens today. Currently, standard CAT screens typically give customers only a full set of standard products, such as checking, savings, and credit offered by the particular financial institution. However, in an embodiment of the present invention, the Global CAT screen displays only buttons with the products that the particular customer actually has.

If the "on-us" customer has two checking accounts, the Global CAT screen displays two checking buttons. Likewise, if the customer has checking, savings, and money market accounts, the Global CAT screen displays buttons only for those accounts, for example, from which the customer can actually withdraw cash, which illustrates the highly configurable aspect for an embodiment of the present invention. These buttons also show the balance of each account, so that the customer does not have to do a separate balance inquiry in order to understand the balances.

In order to make Global CAT 300 work in all different countries, for example, the amounts that are displayed on the Global CAT screen are driven by a business rule. Additionally, for example, the currency and the way that amounts are actually displayed is driven by a business rule, such as using periods as the decimal separator and commas as the thousands separator in the U.S., and the opposite in Europe. All of these aspects are handled using business rules.

In an embodiment, after the customer chooses an amount, the CAT 16 dispenses the cash for the customer. At the end, the Global CAT screen shows the customer resulting balances, which are the particular balances for the particular account. Another aspect for an embodiment of the present invention is the name of the product. For example, if it is desired to call a particular account, such as a checking account, by a special name, that is also driven by the phrase dictionary or phrase database, and a business rule. While the foregoing example illustrates an overview of a single withdrawal transaction by an "on-us" customer, the other functionality works much the same way in terms of configurability.

Another aspect for an embodiment of the present invention, for example, is use of transactions for the traveling customer. This transactions provide, for example, a more standard functionality in which the traveling customer sees only his or her primary accounts, such as checking and savings accounts. For example, the traveling customer is identified from the customer's transaction card dip as an international customer, and the international customer is given his or her standard primary checking, savings, and credit accounts.

In another exemplary embodiment, a customer in a European country can go to a CAT 16 in another European country, and the customer would see what is referred to as "home screens," which are exactly the same Global CAT screens that the customer sees at home. That is driven by the business rules. Thus, if an Italian customer travels to Spain, the CAT 16 deployed in Spain has all the business rules for Italy and Spain, and once the Global CAT 300 detects the Italian customer in Spain, the traveling Italian customer's home screens are presented by the CAT 16. Again, this is illustrative of the configurability aspect of an embodiment of the present invention.

In another embodiment, Global CAT 300 supports visually impaired persons. Because of the configurable nature of Global Cat 300, support for visually impaired persons is treated substantially as if it were a different language in the CAT 16 and the phrases on the screens are slightly different, but the same basic application is used to drive them. The screen looks different, for example, because the Global CAT screens for sighted persons are in color, but the screens for visually impaired persons are in black and white for high contrast, and there are relatively minor changes in the text so that instructions can be more easily read by a screen reader which is employed to read the screen for visually impaired persons. With the screens in the local language, the screen reader is able to support the screens in that language. For example, in Puerto Rico, in order to support visually impaired persons, the screen reader reads the Spanish screens.

VII. Legacy Migration

Figure 11:
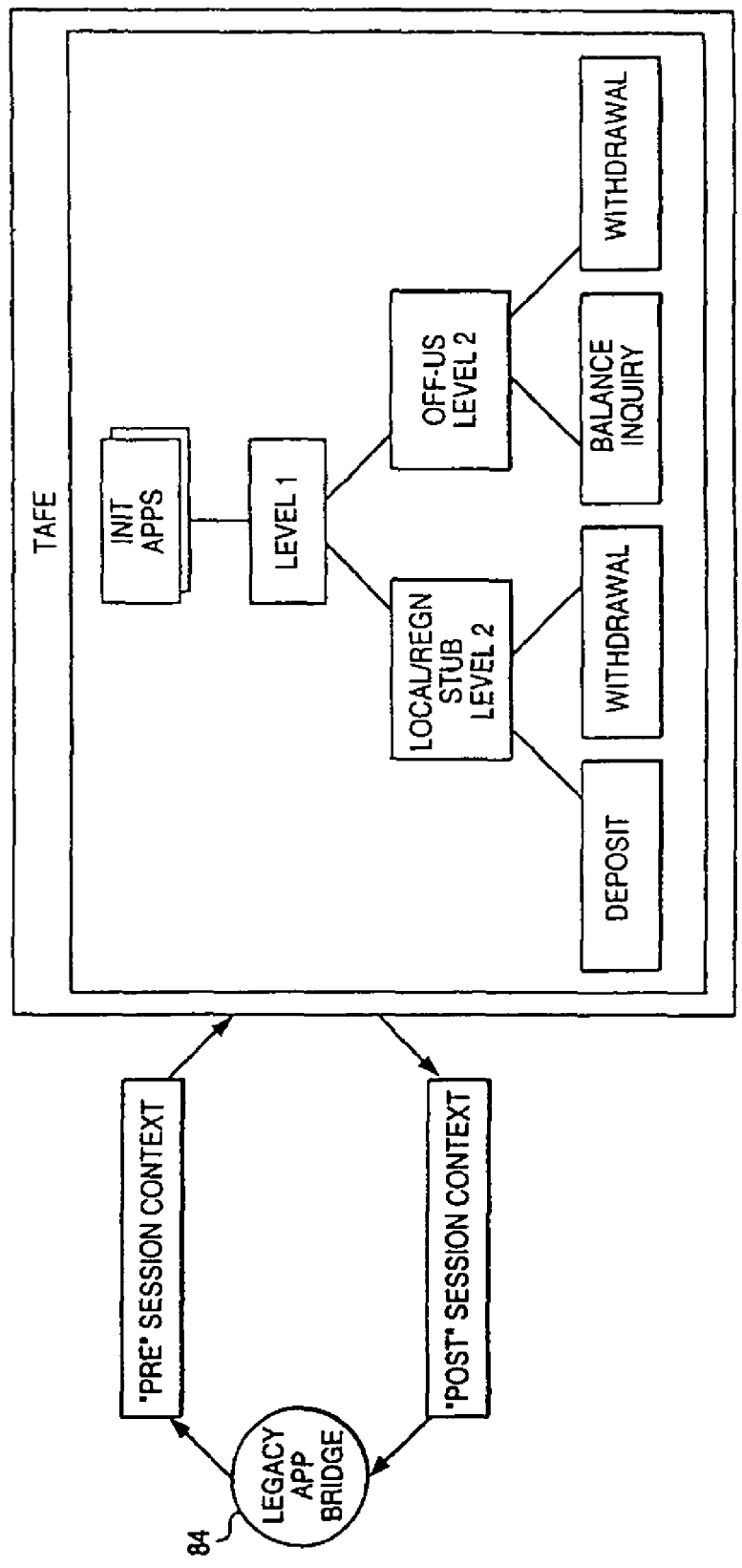
FIG. 11 is an exemplary diagram of an interaction between a legacy app bridge component 84 in the system of FIG. 2 with a legacy application.

The delivery system 12 supports an orderly migration of CAT functionality from implementation with AGS applications to implementation with service components on all platforms where AGS is used to delivery CAT look-and-feel functionality. An example of the interaction between CAT AGS applications and service components will be described with reference to FIG. 11. The AGS applications are executed within an instance of a TAFE process, the legacy run time AGS driver and associated functionality, and share a single persistent global data store. At the time a CAT application is invoked, session context is completely represented by the current state of the persistent global data and the content of the Exit message TAFE passes to the application. If this context can be instantiated by alternate means, then the business/customer functionality normally performed by the AGS level one and level two applications need not be performed before running a level three transaction application. At a high level, pretransaction session context is imported to the TAFE and a level three application is invoked with Exit message. After a return from level three application with Exit message, post transaction session context is exported from TAFE. For the case of a complete session performed in AGS, the interaction includes importing prelanguage selection session context to TAFE, invoking level two application with Exit message, returning from level two application with Exit message, and exporting post end-of-session context from TAFE.

The vehicle for import and export preferably is ELF formatted messages that can be defined in an AGS data dictionary and received and sent by AGS applications. These messages may be defined to be composed by the persistent global variables and tables that comprise the necessary context such that no data manipulation is required in AGS after receipt of the import message or prior to sending the export message. The delivery system 12 does not specify the handling of these message within TAFE or whether they are implemented as a single import message and a single export message per interaction. In general, the session services set 130 must capture and maintain sufficient session context information from which to derive the context representation required by the AGS application to be invoked. The required context will vary in detail by target AGS application set, such as USCAT, EuroCAT, AsiaCAT, LatinCAT and ICC. The required context will also vary with the application being invoked such as a level two or level three application. The legacy application bridge component 84, whether representing an AGS session or an individual AGS transaction application, preferable is capable of constructing and interpreting ELF messages using the data name space appropriate to the target AGS application. The legacy app bridge component 84 embodies the knowledge of the other components it queries and in the specific properties it assesses in order to assemble the session context that it delivers to TAFE. Likewise, the knowledge of the components and properties that must be updated by the modified session context at the completion of an AGS processed transaction or session is also embodied by the legacy app bridge component 84.

The delivery system 12 is not limited to any particular manner for initiating a CAT AGS application. As an example, however, a pre-initialized TAFE AGS driver process is associated with the session bubble. Within the bubble, a faceless level one application waits on receipt of a start of session context message. The legacy app bridge component 84 for the customer selected transaction sends a start of session context message to the TAFE including track two data. The message sent to the TAFE preferably does not contain data from an element ID range specific to a card issuer. The level one application receives the message and updates session context and persistent global memory. Using the track two data, preinitialized static tables, and existing functionality, the level one application creates and sends the exit message to invoke the level two application appropriate to the card issuer. In this example, the level two application is a faceless, special purpose replacement for the original level two application. The level two application is specific to the element ID range of the issuer and sends a request message for the remainder of the session context data. The request message is routed from the TAFE to the legacy app bridge component 84.

The legacy app bridge component 84 queries other service components in order to construct and return a response message containing the remainder of the session context, including data in the element ID range specific to the level two application that sent the request. The level two application receives the message and updates the session context and persistent global memory. Using the transaction type code, language code, and application state code received in the context data, together with existing functionality, the level two application creates and sends the exit message to invoke the level three application appropriate to the transaction type. The level three application processes the transaction and presents screens, sends and receives external service provider messages, device messages and logging messages, and updates session context in persistent global memory. Upon completion, the level three application sends an Exit message to return to the level two application. The level two application sends a message containing the updated post transaction session context which TAFE routes to the legacy app bridge component 84. The level two application also sends an Exit message to return to the level one application. The level one application waits in receipt of another start of session context message. The legacy app bridge 84 receives the post transaction session context and processes it causing the session context to be updated in the other appropriate service components. In this example, the level one and level two applications perform no customer or business functionality. The role of the level one and level two applications instead is preferably limited to receiving and returning context data and invoking the appropriate lower level application. The delivery system 12, however, can vary from that described above.

VIII. Rule Broker

One advantage of the delivery system 12 is the separation of individually-installable business rules from the code embodied in the transactions specific components. Application components needing answers to rule questions asks the rule broker component 121 without knowing any details about how the rules are encoded and answered. The rule broker component 121 routes the question to the appropriate component which can supply an answer. Components which supply rule answers may be installed independently of components which ask the rule questions. In addition, any data used by a rule "answerer" may be installed or replaced independently from components which use that data to determine answers to rule questions.

In general, a business rule is a statement of policy driven by business or regulatory needs, which defines context specific behavior of the applications. A business rule in the delivery system 12 may comprise any statement policy driven by business or regulatory needs, which defines context-specific behavior of an application. Business rules are discrete items which may be modified independently from other application components. Examples of business rules are choosing dispense amounts to display, maximum PIC retries, assignment of product types to summary categories, assignment of product types to product categories, and the number of account digits on print records. On average, fifty to one hundred business rules may exist per region with most of the rules being issuer rules and a fewer number of acquirer rules.

The rule broker component 121 is a single entity which components of the delivery system 12 may access to obtain answers to the business rule questions which affect application processing. The rule broker component 121 receives rule registration requests, registers rules in a rule registry, receives rule queries and routes them to the registered provider for that rule. The rule broker component 121 provides a mechanism for rule authorities to register themselves as answers for particular rule questions. When application components query the rule broker for a particular rule, the rule broker component 121 routes the query to the appropriate rule authority or to the rule engine. The rule broker component 121 itself is not aware of the actual semantics of any of the rules. In the preferred embodiment, the rule broker component 121 is used by the mini-app dialog components 83, the transaction executor components 91, the presentation manager component 52, the navigation shell component 82, the welcome mat component 81, and the legacy app bridge component 84. Although the delivery system 12 preferably includes the rule broker component 121, certain components within the delivery system 12 can be direct answerers of questions when appropriate.

The rule authority is a component which can answer rule questions. Components within the delivery system 12 act in the role of a rule authority component if they register themselves with the rule broker component 121 as the answerer of a named rule. For instance, the issuer component 112, the acquirer component 114, and the delivery capabilities component 133 may each be a rule authority. The rule authority components register rules with the rule broker component 121 and provide answers for the rules that they have registered. The rule authority components may access separately installable data to answer rule questions and this data may be separate from the rule registry information used by the rule broker component 121 and the rule engine.

The rule engine is a general rule interpreter. The rule engine can answer a rule query based on parameters passed in the query and some interpretable rule data in the rule database. Unlike rule authorities, the rule engine has no specific knowledge of rules or applications. The rule engine determines answers for rules and is used by the rule broker component 121 and calls the rule registry.

In operation, each rule registered with the rule broker will have a unique name which includes a version identifier. The name will be passed separately from other parameters in a rule query. All rule query parameters aside from the name will be passed in a self-defining way, for instance, a rule query may contain a name, type, and value for each parameter. Each rule registered with the rule broker will exist as an independent record in a rule registry. A rule in the rule registry will be defined as either data, such as an encoded string, which can be interpreted by a general rules engine or a rule authority which is registered to answer a rule. A component's registration of a rule may override a previous component's registration for that same rule. Each registered rule will define the expected type of parameters to be passed and rules can be dynamically added to the rule registry independently of all other rules.

The rule broker component 121 will route a rule query either to the general rules engine or to a sequence of rule authorities until an answer is obtained or no more authorities are available. The rule broker component 121 routes queries based only on the rule name and does not validate the parameter list. The rule authority or authorities are responsible for validating the parameters.

A preferred protocol exists between the rule broker and components querying the rule broker. Any component querying the rule broker must be prepared to handle the case of "no answer" gracefully. For example, a no answer may occur when no such rule is registered or when the component registered to answer the rule cannot answer. Also, the rule broker component 121 must return a specific "no answer" answer to a requester when no answer is available. Further, the rules engine and all rule authorities should dynamically check the parameter list and return the appropriate "no answer" if a discrepancy between the expected and received parameters exist.

A. Example 1

Dispense Amounts

A set of complex rules, spanning multiple configuration tables, is used in the AGS implementation when choosing what dispense amounts are displayed on selection buttons to a customer withdrawing cash at a CAT 16. The existing "withdraw cash" application is tightly coupled to the structure of these tables. The acquirer component 114 might register as a rule authority for the "WhatDispenseAmounts?" question. The input parameters for this question include the product type, which specifies the product being withdrawn from, and the currency. The output parameters include the result code and the variable length list of amounts. Some of the session data needed to answer the question, such as card type and level of service, is available from known session components and consequently is not passed as input. The acquirer component 114, in processing the request, may query whatever database contains specific rules for dispense amounts and ask the peripheral device manager component 62 to determine what denominations are available.

B. Example Two

Maximum PIC Retries?

As another example, a rule "MaxPICRetries?" to be processed by the rule engine is registered in the rule database. This rule has no input parameters and has output parameters of a result code and MaxPICRetries. As rule data, some interpretable data which indicates that a "business options" table should be searched for the MaxPICRetries value matching the session values of issuer and card type. All of the session data needed to answer the question, such as the issuer and card type, is available from known session components so no specific input parameters are needed. The rule engine searches the specified table for a match on the session issuer and card type and returns the value of MaxPICRetries for that match.

IX. Tools and Languages

The delivery system 12 is preferably language neutral. The applications can be written in any language which supports the object model used to specify the delivery system 12. Consequently, different components may be implemented in different languages and may migrate to a different language over time. As examples, VisualBasic, C++, and Java may be used in implementing the components of the delivery system 12.

The delivery system 12 is also not limited to any particular integrated development environment (IDE). The IDE, however, should have support for multi-user shared development and should have integration with a configuration management capability. The IDE should also support a tool "plug-in" capability to allow tools to be added which are unique to the delivery system 12. Some examples of these "plug-in" tools include configuration tools to allow for the maintenance of system configuration information and test tools including host and device emulators. Other tools include software distribution tools to standardize the method by which software upgrades are distributed, system management and logging tools, security protocols, and middle-ware for distributed object support in legacy system interfaces. Further tools include template development tools for both canonical and device specific templates, a rules database editor, services registry maintenance tools, and language man repository editor. The IDE preferably supports all of the selected targeted languages so as to minimize retraining and allows reuse of "plug-in" of tools across development languages. The operating system for the delivery system 12 is preferably Microsoft's Windows NT but may alternatively operate on other operating systems, such as a Macintosh or a UNIX operating system.

A component in the delivery system 12 may comprise any piece of hardware or software that is potentially independently replaceable with the software components being embodied as either executables (.EXEs) or dynamically loaded libraries (.DLLs). Components generally have well-defined interfaces. An application, in contrast, is a set of components that does a specific business function, such as cash withdrawal and may comprise several components. Each application in the delivery system 12 preferably comprises one or more dialog components 83 for handling the user interface, one or more business rule components 121, and one or more transaction executor components 91 for handling the message interface with external service providers 22.

X. Conclusion

The delivery system 12 advantageously provides a common application base for customer activated applications for all remote devices. Thus, a financial institution need not have a first delivery system for its ATMs, a second delivery system for its staff tellers, a third delivery system for personal computers or PDAs, and a fourth delivery system for external service providers. Instead, home banking devices such as a personal computer 18, a smart phone 14, an Internet browser remote device 24, and a PDA 20 may all access the books of a financial institution through the delivery system 12. In addition, the delivery system 12 may provide financial services to its customers through its CAT/CASST 16 and to its employees through branch and CSR staff platforms 26.

The delivery system 12 supports convergence to a base set of reusable global application components. These components may be reassembled in different combinations and organizations to form application suites or they may be customized for the environment in which they are used. Furthermore, the global application component may be complemented by components from a local business.

The delivery system 12 provides state of the art user interfaces. The interfaces provided by the delivery system 12 support integration of standard multi-media elements, such as pictures, video, and audio. The interfaces also support customizations needed for specific devices, languages, countries, and other local business needs. The interfaces further support multiple co-existing application navigation paradigms and also support the user working in multiple application components at a single time.

The interfaces are configured based on a personalization aspect that allows the financial institution to service customers faster. The delivery system 12 allows a legacy application to configures a user-friendly interface between the remote device and the customer using the customer's account profile, various languages, various currencies, different legal regulatory requirements, as well as, different sets of business products. For example, Global CAT configures and delivers globally consistent "home screens" to a customer using the language man component 122 and the rule broker component 121 based on the customer's account profile and business rules associated with the business coupled with the remote device.

The delivery system 12 substantially improves development and maintenance cycle time. The delivery system 12 uses prefabricated components and templates instead of "from scratch" development. The delivery system 12 may embrace widely accepted industry standards for component interfaces so that off the shelf "plumbing" may connect components and enable plugging-in third party components. The delivery system 12 supports "plug and play" application components that can automatically configure themselves for the environment and automatically insert themselves into top level navigation menus. The delivery system 12 supports high productivity prototyping/development tools for top level navigation definition and user interface design, making use of predefined look-and-feel standards. The delivery system 12 separates different parts of an application so that changes in one part do not affect other parts.

The delivery system 12 provides a smooth gradual migration from legacy applications into a new architecture. The delivery system 12 supports the harmonious coexistence of software built under the delivery system 12 along with existing legacy AGS applications. As a result, financial institutions do not need to introduce a totally new system but rather may leverage their existing legacy AGS applications while taking advantage of the delivery system 12.

It should be recognized that the system and method disclosed are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A platform-independent method for configuring a self-service financial transaction device in a global communications network having a plurality of nodes interconnected with communication lines, comprising:

receiving a session request from a user using a transaction card at an interactive interface to access said self-service financial transaction device and ascertaining from the transaction card a status of the user as a customer or non-customer and a status of the user as a vision impaired or vision unimpaired user;

associating, selectively said session request with pre-stored parameters for configuring a standardized user-specific interactive interface, wherein said parameters consist at least in part of a set of parameters for determining financial application functions to be offered to the user based on a status of the user as a customer or non-customer and a set of parameters for determining language application functions to be offered to the user based on the status of the user as a vision impaired or vision unimpaired user; and displaying said standardized customer-specific interactive interface to provide said user with the offering of financial application functions depending on the status of the user as a customer or non-customer and language application functions depending on the status of the user as a vision impaired or vision unimpaired user.

\* \* \* \* \*